(12) United States Patent
Dudar

(10) Patent No.: US 11,578,676 B1
(45) Date of Patent: Feb. 14, 2023

(54) METHODS AND SYSTEMS FOR EVAPORATIVE EMISSION CONTROL SYSTEM DIAGNOSTICS

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/444,366

(22) Filed: Aug. 3, 2021

(51) Int. Cl.
   *F02M 33/02* (2006.01)
   *F02D 41/22* (2006.01)
   *B01D 53/04* (2006.01)

(52) U.S. Cl.
   CPC ......... *F02D 41/22* (2013.01); *B01D 53/0454* (2013.01); *B01D 2253/102* (2013.01); *B01D 2257/702* (2013.01); *B01D 2259/40088* (2013.01); *B01D 2259/4516* (2013.01); *B01D 2259/4566* (2013.01); *F02D 2041/224* (2013.01); *F02D 2200/0602* (2013.01)

(58) Field of Classification Search
   CPC .... F02D 41/22; F02D 19/025; F02D 19/0623; F02D 2250/02; F02M 25/08; F02M 25/0836; F02M 25/0872; F02M 55/007
   USPC .................. 123/516, 518, 520; 701/101, 114
   See application file for complete search history.

(56) References Cited

U.S. PATENT DOCUMENTS

| | | | |
|---|---|---|---|
| 6,321,727 B1 | 11/2001 | Reddy et al. | |
| 9,410,507 B2 | 8/2016 | Pearce et al. | |
| 10,167,823 B2 | 1/2019 | Dudar | |
| 2012/0152210 A1 | 6/2012 | Reddy et al. | |
| 2020/0369508 A1* | 11/2020 | Dudar | B60K 15/03504 |
| 2022/0319254 A1* | 10/2022 | Dudar | G07C 5/0816 |

* cited by examiner

*Primary Examiner* — John Kwon
(74) *Attorney, Agent, or Firm* — Vincent Mastrogiacomo; McCoy Russell LLP

(57) ABSTRACT

Methods and systems are provided for diagnosing degradation and/or alteration in an evaporative emission control system of a vehicle. In one example, a method may include, during a refueling, monitoring a fuel tank pressure and a fuel fill level, and detecting a presence or an absence of a fuel vapor canister of the EVAP system based on a change in fuel tank pressure with an increase in fuel level.

8 Claims, 8 Drawing Sheets

METHODS AND SYSTEMS FOR EVAPORATIVE EMISSION CONTROL SYSTEM DIAGNOSTICS

FIELD

The present description relates generally to methods and systems for diagnosing degradation and/or alteration in an evaporative emission control system of a vehicle, and particularly for detecting a missing or degraded fuel vapor canister included therein.

BACKGROUND/SUMMARY

Vehicles may include a fuel system connected to an evaporative emission control (EVAP) system, wherein a fuel tank of the fuel system may be fluidically coupled to one or more fuel vapor canisters of the EVAP system for filtering and venting fuel vapors from the fuel tank. In order to reduce emissions and comply with regulations, fuel vapors from the fuel tank are stored in the fuel vapor canister of the EVAP system. Fuel vapor stored in the canisters may be periodically and opportunistically purged to the engine cylinders. Over time and use, the fuel vapor canister may be degraded or damaged and may need to be replaced. However, replacing such canisters may be considerably expensive. In absence of an operational fuel vapor canister, fuel vapor may no longer be stored in the EVAP system and may be released to the atmosphere, thereby increasing undesired emissions.

Several attempts have been recognized to identify degradations such as leaks in an EVAP system. One example approach is shown by Reddy et al. in U.S. Pat. No. 6,321,727. Therein, the EVAP system may be diagnosed during an engine-off condition. Fuel tank temperature, pressure data, and fuel level data is analyzed over a period of time. The EVAP system may be sealed and the changes in system pressure may be analyzed over another time period as the fuel cools by heat loss to detect the vacuum that will occur if the system has no leak. In this way, an engine off natural vacuum test may be carried out to detect degradation of the EVAP system.

However, the inventors herein have recognized potential issues with such systems. In certain situations, after removing a faulted canister, instead of replacing the faulted canister, to save parts costs, it is known to tamper or alter the EVAP system in a way such that there are no detectable leaks in the system. As one example, even though the diagnostic method described by Reddy et al. can detect a leak in the EVAP system or absence of a fuel vapor canister, Reddy et al. does not show a method to detect tampering of the canister instead of replacement. As an example, the canister may be replaced with a straight tube (connecting the fuel vapor line directly to atmosphere) which would allow fuel vapor to escape to the atmosphere. Further, if the fuel vapor canister gets plugged, it may not be possible to further load the canister with fuel vapor which may result in undesirable emissions levels.

In one example, the issues described above may be addressed by a method for an engine in a vehicle, comprising: detecting a presence or an absence of a fuel vapor canister of an evaporative emissions control (EVAP) system based on a change in fuel tank pressure with an increase in fuel level. In this way, by detecting absence of fuel vapor canister even when a leak is not detectable by other diagnostic methods, robustness of EVAP system diagnostics may be improved.

As one example, during a refueling event, fuel vapor generated in the fuel tank is routed to the fuel vapor canister by opening a fuel tank isolation valve. During loading of the canister, a fuel fill level and a change in fuel tank pressure may be monitored. A fuel fill rate may be estimated as a function of a time to refill the fuel tank to capacity. A change in fuel tank pressure relative to the fill rate may be monitored for a threshold duration and compared to one or more pre-calibrated thresholds. If the change in fuel tank pressure relative to the fill rate is lower than a first threshold, it may be inferred that the fuel vapor canister is missing and has been replaced with a straight tube. If the change in fuel tank pressure relative to the fill rate is higher than a second threshold and refueling is shut-off, it may be inferred that the canister may be plugged and/or degraded. If the change in fuel tank pressure relative to the fill rate follows a pre-calibrated curve, it may be inferred that the canister is present and fully functional. For engines including multiple canisters, the change in fuel tank pressure relative to the fill rate may be compared to different pre-calibrated curves to infer if one or more canisters are missing and replaced with straight tubes.

In this way, by monitoring change in fuel tank pressure during refueling, it is possible to identify if one or more fuel vapor canisters are missing even if EVAP system diagnostics do not detect any leaks in the system. The technical effect of identifying missing canisters is that it is possible to detect tampering in vehicle engines, and adjust vehicle operation for suitable mitigation. By undertaking suitable mitigating actions, degradation of emissions quality may be reduced. Overall, by using existing engine components for complete EVAP system diagnostics, robustness of the EVAP system may be improved and emissions compliance may be maintained.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
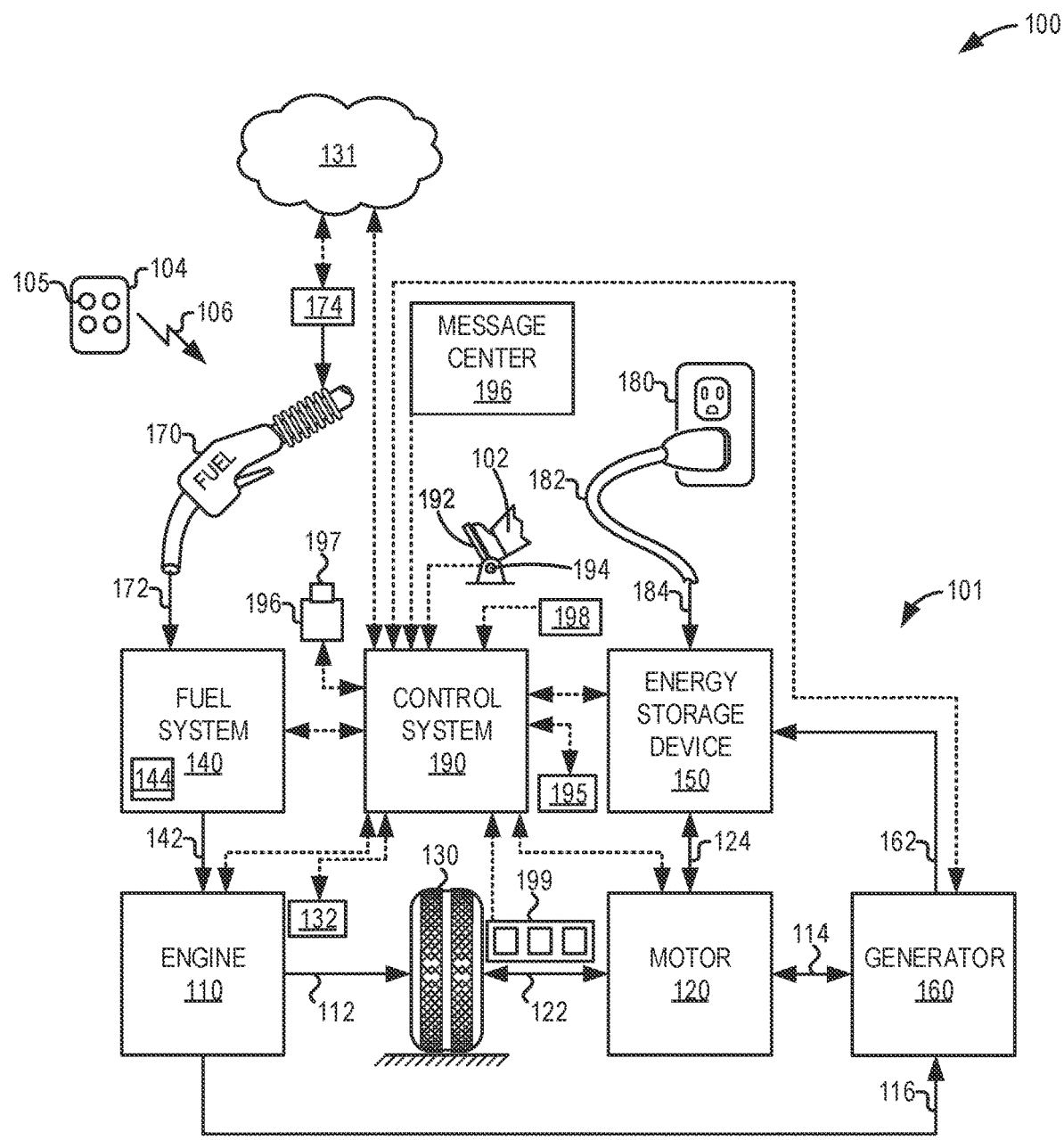
FIG. 1 shows a high-level block diagram illustrating an example hybrid vehicle system.
Figure 2:
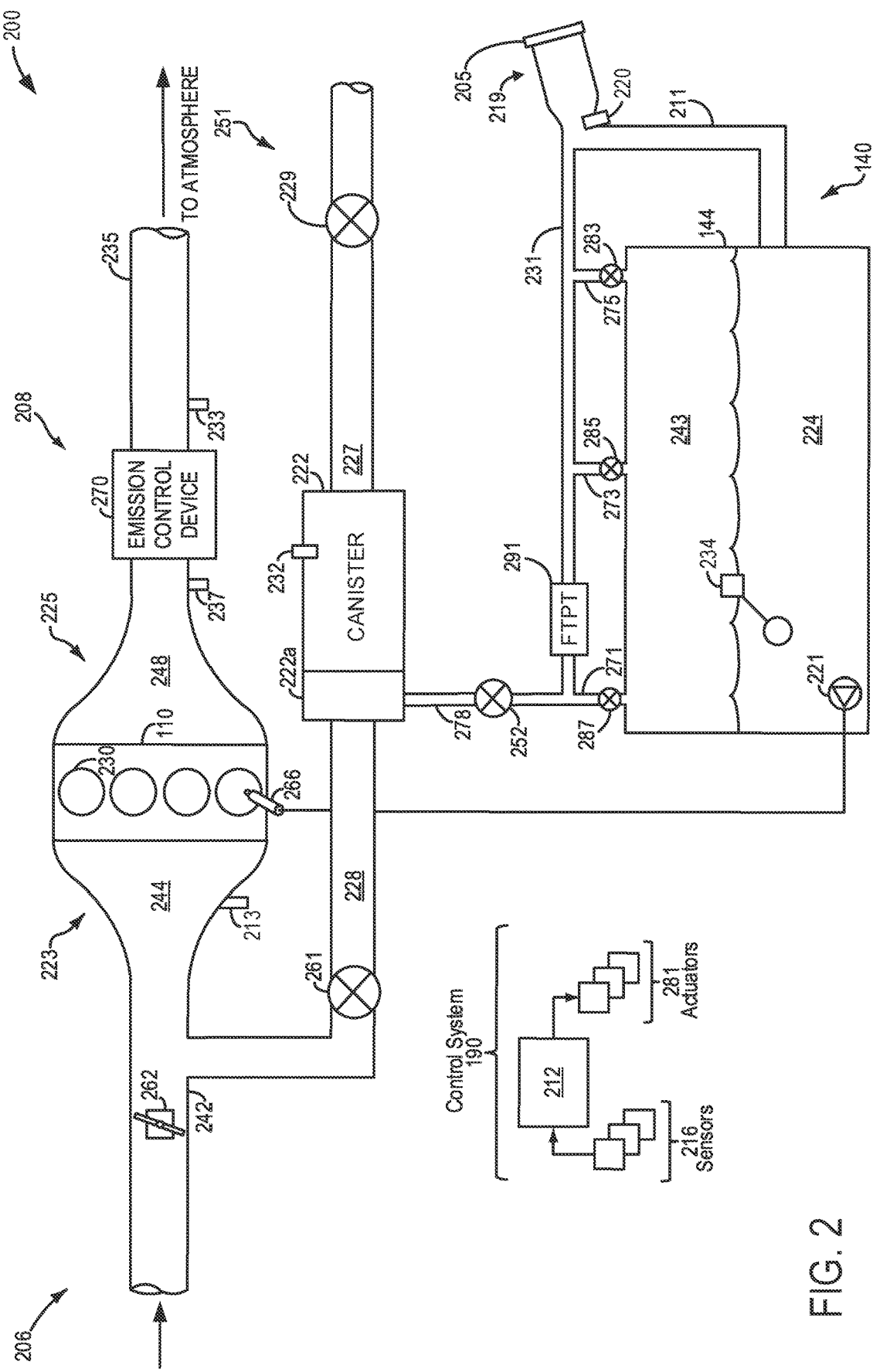
FIG. 2 shows a schematic diagram of a portion of the example vehicle system of FIG. 1 including a fuel system and an evaporative emission control system.
Figure 3A:
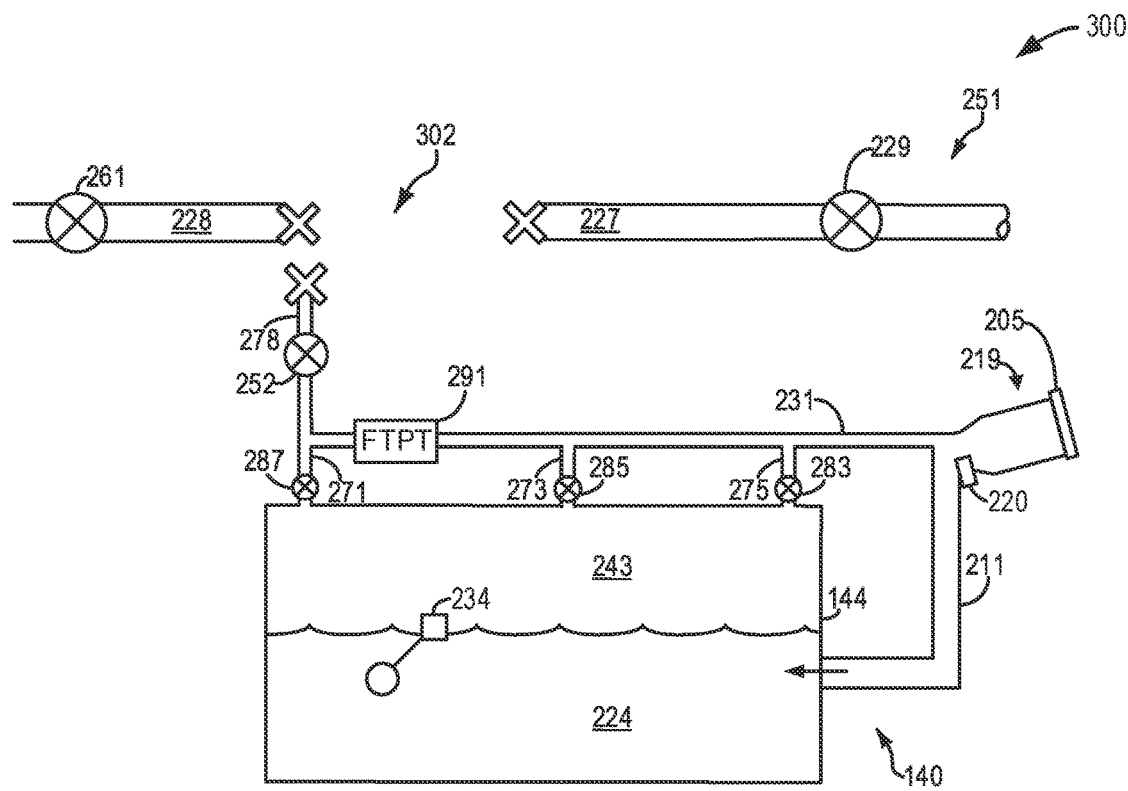
FIG. 3A shows a schematic diagram of the evaporative emission control system of FIG. 2 indicating tampering or alteration that causes a large detectable leak.
Figure 3B:
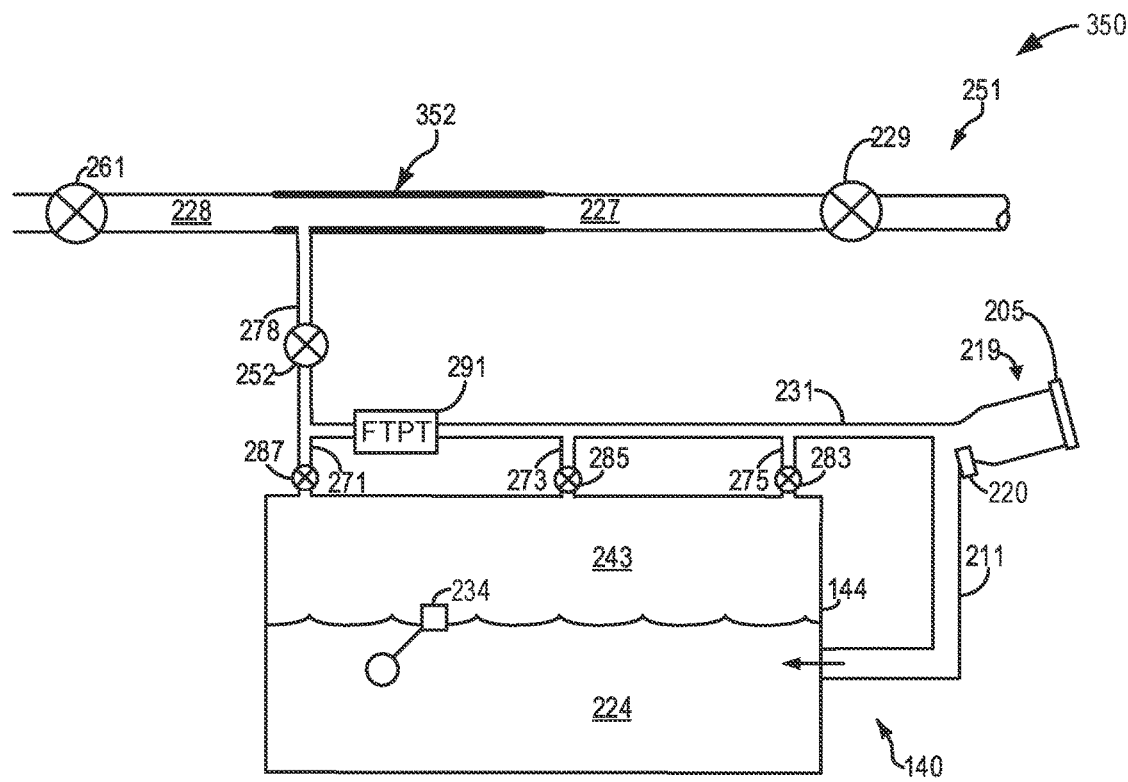
FIG. 3B shows a schematic diagram of the evaporative emission control system of FIG. 2 indicating tampering or alteration that causes an undetectable degradation.
Figure 6:
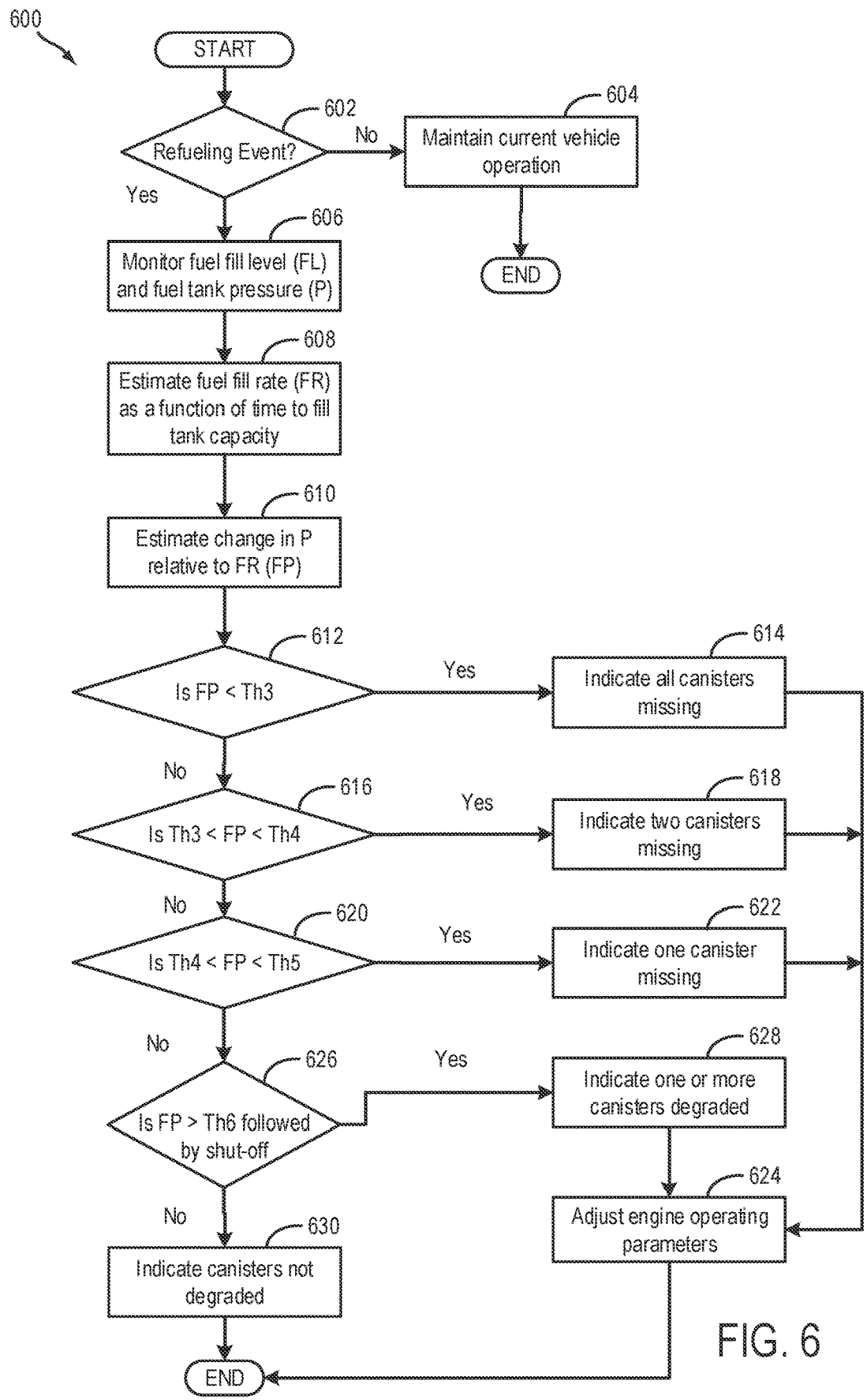
FIG. 6 shows a flow chart of an example method for detecting tampering or degradation in an evaporative emission control system including two or more fuel vapor canisters.
Figure 7:
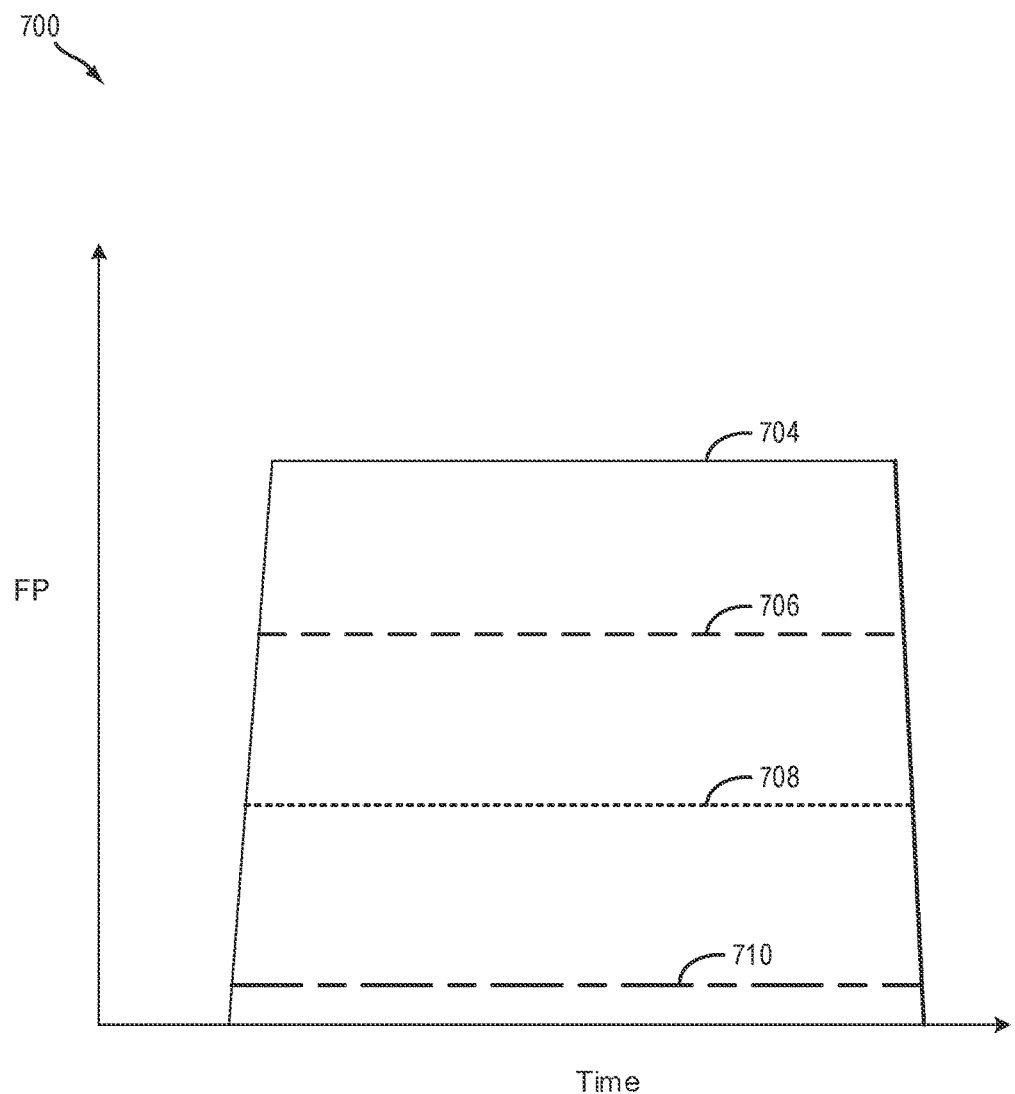
FIG. 7 shows a plot of change in fuel tank pressure relative to the fill rate during refueling for detection of tampering or degradation in the evaporative emission control system including two or more fuel vapor canisters.
Figure 7:
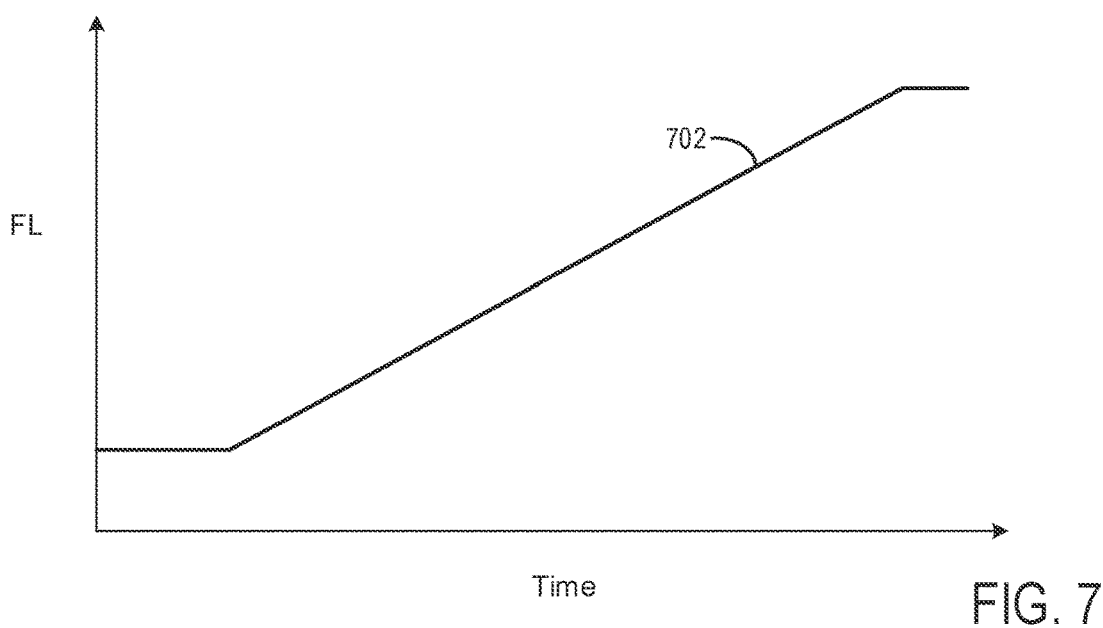
Figure 8:
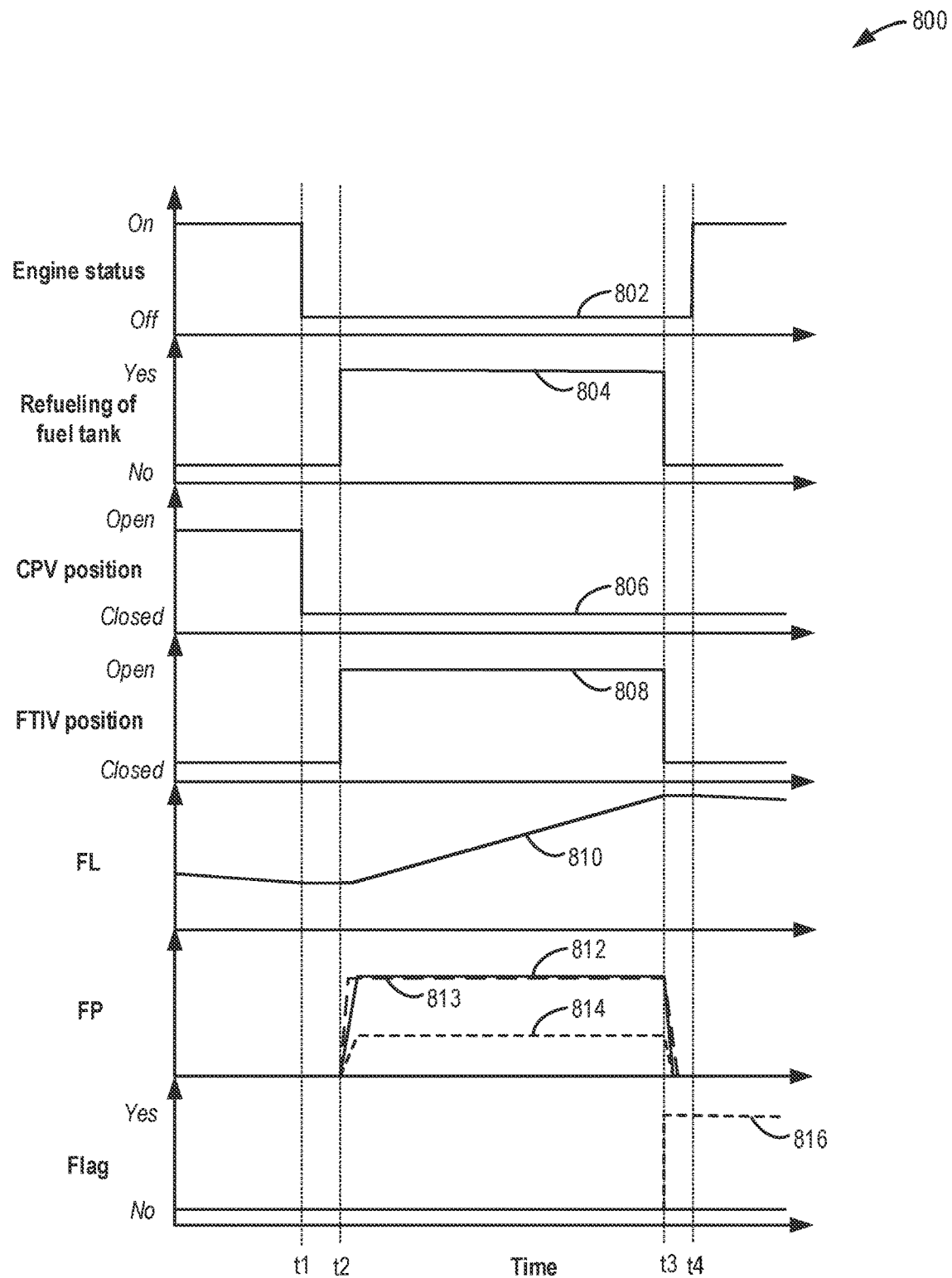
FIG. 8 shows an example timeline for a diagnostics routine of the evaporative emission control system of a vehicle.

The following description relates to systems and methods for diagnosing degradation and/or alteration in an evaporative emission control (EVAP) system of a vehicle, such as the vehicle system of FIG. 1. The vehicle system of FIG. 1 may include a fuel system and an EVAP system fluidically coupled to each other, as shown in FIG. 2. A degradation in the EVAP system may include a leak in the EVAP system, and/or a degraded or a missing fuel vapor canister. FIGS. 3A-3B provide schematic diagrams of the EVAP system with a missing fuel vapor canister. A controller may be configured to perform a control routine, such as the example routine of FIG. 4, to detect leaks in the EVAP system. Degradation or tampering in the EVAP system not detectable by the routine of FIG. 4, may be detectable by the example routines of FIGS. 5-6. An example plot showing change in fuel tank pressure relative to the fill rate during refueling for detection of tampering or degradation via the routine of FIG. 6 is shown in FIG. 7. Further, FIG. 8 provides a graphical display of an exemplary vehicle operating sequence during diagnostics of the EVAP system.

Referring now to FIG. 1, a high-level block diagram 100 depicting an example vehicle propulsion system 101 is shown. Vehicle propulsion system 101 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. In such an example, a vehicle with vehicle propulsion system 101 may be referred to as a hybrid electric vehicle (HEV).

Vehicle propulsion system 101 may utilize a variety of different operational modes depending on operating conditions encountered by the vehicle propulsion system. Some of these modes may enable engine 110 to be maintained in an off state (e.g., set to a deactivated state) where combustion of fuel at the engine is discontinued. For example, under select operating conditions, motor 120 may propel the vehicle via one or more drive wheels 130 (as indicated by an arrow 122) while engine 110 is deactivated.

During other operating conditions, engine 110 may be set to a deactivated state (as described above) while motor 120 may be operated to charge an energy storage device 150. For example, motor 120 may receive wheel torque from drive wheel(s) 130 (as indicated by arrow 122), where the motor may convert the kinetic energy of the vehicle to electrical energy for storage at an energy storage device 150 (as indicated by an arrow 124). This operation may be referred to as regenerative braking of the vehicle. Thus, motor 120 can provide a generator function in some examples. However, in other examples, a generator 160 may instead receive wheel torque from drive wheel(s) 130, where the generator may convert the kinetic energy of the vehicle to electrical energy for storage at energy storage device 150 (as indicated by an arrow 162).

During still other operating conditions, engine 110 may be operated by combusting fuel received from a fuel system 140 (as indicated by an arrow 142). For example, engine 110 may be operated to propel the vehicle via drive wheel(s) 130 (as indicated by an arrow 112) while motor 120 is deactivated. During other operating conditions, both engine 110 and motor 120 may each be operated to propel the vehicle via drive wheel(s) 130 (as indicated by arrows 112 and 122, respectively). A configuration where both engine 110 and motor 120 may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle propulsion system 101 may be configured as a series type vehicle propulsion system, whereby engine 110 does not directly propel drive wheel(s) 130. Rather, engine 110 may be operated to power motor 120, which may in turn propel the vehicle via drive wheel(s) 130 (as indicated by arrow 122). For example, during select operating conditions, engine 110 may drive generator 160 (as indicated by an arrow 116), which may in turn supply electrical energy to one or more of motor 120 (as indicated by an arrow 114) and energy storage device 150 (as indicated by arrow 162). As another example, engine 110 may be operated to drive motor 120 which may in turn provide a generator function to convert engine output to electrical energy, where the electrical energy may be stored at energy storage device 150 for later use by motor 120.

Fuel system 140 may include one or more fuel tanks 144 for storing fuel onboard the vehicle. For example, fuel tank 144 may store one or more liquid fuels, including but not limited to gasoline, diesel, and alcohol fuels. In some examples, the fuel may be stored onboard the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 (as indicated by arrow 142). Still other suitable fuels or fuel blends may be supplied to engine 110, where they may be combusted at engine 110 to produce the engine output. The engine output may be utilized to propel the vehicle (e.g., via drive wheel(s) 130, as indicated by arrow 112) or to recharge energy storage device 150 via motor 120 or generator 160.

In some examples, energy storage device 150 may be configured to store electrical energy that may be supplied to other electrical loads residing onboard the vehicle (other than motor 120), including cabin heating and air conditioning, engine starting, headlights, cabin audio and video systems, etc. As a non-limiting example, energy storage device 150 may include one or more batteries and/or capacitors.

A control system 190 may communicate at least with one or more of engine 110, motor 120, fuel system 140, energy storage device 150, and generator 160. Specifically, control system 190 may receive sensory feedback information at least from one or more of engine 110, motor 120, fuel system 140, energy storage device 150, and generator 160. Further, control system 190 may send control signals at least to one or more of engine 110, motor 120, fuel system 140, energy storage device 150, and generator 160 responsive to the sensory feedback information. Control system 190 may receive an indication of an operator requested output of vehicle propulsion system 101 from a vehicle operator 102. For example, control system 190 may receive sensory feedback from a pedal position sensor 194 which communicates with a pedal 192. Pedal 192 may refer schematically to a brake pedal and/or an accelerator pedal. Furthermore, in some examples, control system 190 may be in communication with a remote engine start receiver 195 (or transceiver) that receives wireless signals 106 from a key fob 104 having a remote start button 105. In other examples (not shown), a remote engine start may be initiated via a cellular telephone or smartphone based system where a cellular telephone or smartphone (e.g., operated by vehicle operator 102) may send data to a server and the server may communicate with the vehicle (e.g., via a wireless network 131) to start engine 110.

Energy storage device 150 may periodically receive electrical energy from a power source 180 residing external to the vehicle, e.g., not part of the vehicle (as indicated by an arrow 184). As a non-limiting example, vehicle propulsion system 101 may be configured as a plug-in HEV (PHEV), whereby electrical energy may be supplied to energy storage device 150 from power source 180 via an electrical energy transmission cable 182. During a recharging operation of energy storage device 150 from power source 180, electrical energy transmission cable 182 may electrically couple energy storage device 150 to power source 180. When vehicle propulsion system 101 is subsequently operated to propel the vehicle, electrical energy transmission cable 182 may be disconnected between power source 180 and energy storage device 150. Control system 190 may identify and/or control an amount of electrical energy stored at energy storage device 150, which may be referred to as a state of charge (SOC).

In other examples, electrical energy transmission cable 182 may be omitted, and electrical energy may instead be received wirelessly at energy storage device 150 from power source 180. For example, energy storage device 150 may receive electrical energy from power source 180 via one or more of electromagnetic induction, radio waves, and electromagnetic resonance. More broadly, any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle (e.g., during a refueling event). As a non-limiting example, vehicle propulsion system 101 may be refueled by receiving fuel via a fuel dispensing device 170 (as indicated by an arrow 172), the fuel dispensing device being supplied with fuel by an external fuel pump 174. In some examples, fuel tank 144 may be configured to store the fuel received from fuel dispensing device 170 until the fuel is supplied to engine 110 for combustion. In some examples, control system 190 may receive an indication of a level of the fuel stored at fuel tank 144 (also referred to herein as the fuel level or fill level of fuel tank 144) via a fuel level sensor. The level of fuel stored at fuel tank 144 (e.g., as identified by the fuel level sensor) may be communicated to vehicle operator 102, for example, via a fuel gauge or indication in a vehicle instrument panel 196. In additional or alternative examples, control system 190 may be coupled to external fuel pump 174 via wireless network 131 (e.g., in a "smart" fuel pump configuration). In such examples, control system 190 may receive (e.g., via wireless network 131) signals indicative of an amount of fuel dispensed, a rate of fueling (e.g., during the refueling event), a distance of the vehicle from external fuel pump 174, an amount of money or credit available to vehicle operator 102 with which to purchase fuel at external fuel pump 174, etc. In some examples, the vehicle instrument panel 196 may include a refueling button which may be manually actuated or pressed by a vehicle operator to initiate refueling. For example, in response to the vehicle operator actuating the refueling button, fuel tank 144 in the vehicle may be depressurized so that refueling may be performed.

Vehicle propulsion system 101 may also include an ambient temperature/humidity sensor 198, and a roll stability control sensor, such as a lateral and/or longitudinal and/or yaw rate sensor(s) 199. As shown, sensors 198, 199 may be communicably coupled to control system 190, such that the control system may receive signals from the respective sensors. Vehicle instrument panel 196 may include indicator light(s) and/or a text-based display in which messages are displayed to vehicle operator 102 (e.g., such as an indication of a degradation status of a vehicle component generated by a diagnostic control routine). Vehicle instrument panel 196 may also include various input portions 197 for receiving an operator input, such as depressible buttons, touch screens, voice input/recognition, etc.

In additional or alternative examples, vehicle instrument panel 196 may communicate audio messages to vehicle operator 102 in combination with, or entirely without, visual display. Further, sensor(s) 199 may include a vertical accelerometer to indicate road roughness, the vertical accelerometer being communicably coupled to control system 190, for example. As such, control system 190 may adjust engine output and/or wheel brakes to increase vehicle stability in response to signals received from sensor(s) 199.

Control system 190 may be communicably coupled to other vehicles or infrastructures using appropriate communications technology. For example, control system 190 may be coupled to other vehicles or infrastructures via wireless network 131, which may comprise Wi-Fi, Bluetooth®, a type of cellular service, a wireless data transfer protocol, and so on. Control system 190 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. The communication and the information exchanged between vehicles may either be direct between vehicles, or multi-hop. In still other examples, control system 190 may be communicably coupled to other vehicles or infrastructures via wireless network 131 and the Internet (e.g., cloud). In further examples, wireless network 131 may be a plurality of wireless networks 131 across which data may be communicated to vehicle propulsion system 101.

Vehicle propulsion system 101 may also include an onboard navigation system 132 (for example, a global positioning system, or GPS) with which vehicle operator 102 may interact. Onboard navigation system 132 may include one or more location sensors for assisting in estimating vehicle speed, vehicle altitude, vehicle position/location, etc. Such information may be used to infer engine operating parameters, such as local barometric pressure. As discussed above, control system 190 may be configured to receive information via the Internet or other communication networks. Accordingly, information received at control system 190 from onboard navigation system 132 may be cross-referenced to information available via the Internet to determine local weather conditions, local vehicle regulations, etc.

Referring to FIG. 2, a schematic diagram 200 depicting a vehicle system 206 is shown. In some examples, vehicle system 206 may be an HEV system, such as a PHEV system. For example, vehicle system 206 may be the same as vehicle propulsion system 101 of FIG. 1. However, in other examples, vehicle system 206 may be implemented in a non-hybrid vehicle (e.g., a vehicle equipped with an engine and without a motor operable to at least partially propel the vehicle).

Vehicle system 206 may include an engine system 208 coupled to each of an evaporative emissions control system 251 and fuel system 140. Engine system 208 may include engine 110 having a plurality of cylinders 230. Engine 110 may include an engine air intake system 223 and an engine exhaust system 225. Engine air intake system 223 may include a throttle 262 in fluidic communication with an engine intake manifold 244 via an intake passage 242. Further, engine air intake system 223 may include an air box and filter (not shown) positioned upstream of throttle 262. Engine exhaust system 225 may include an exhaust manifold 248 leading to an exhaust passage 235 that routes exhaust gas to the atmosphere. Engine exhaust system 225 may include an emission control device 270, which in one example may be mounted in a close-coupled position in exhaust passage 235 (e.g., closer to engine 110 than an outlet of exhaust passage 235) and may include one or more exhaust catalysts. For instance, emission control device 270 may include one or more of a three-way catalyst, a lean nitrogen oxide ($NO_x$) trap, a diesel particulate filter, an oxidation catalyst, etc.

It will be appreciated that other components may be included in engine system 208 such as a variety of valves and sensors. For example, a barometric pressure sensor 213 may be included in engine air intake system 223. In one example, barometric pressure sensor 213 may be a manifold air pressure (MAP) sensor and may be coupled to engine intake manifold 244 downstream of throttle 262. Barometric pressure sensor 213 may rely on part throttle or full or wide open throttle conditions, e.g., when an opening amount of throttle 262 is greater than a threshold, in order to accurately determine a barometric pressure.

Fuel system 140 may include fuel tank 144 coupled to a fuel pump system 221. Fuel pump system 221 may include one or more pumps for pressurizing fuel delivered to cylinders 230 via fuel injectors 266 during a single cycle of cylinders 230 (while only a single fuel injector 266 is shown at FIG. 2, additional fuel injectors may be provided for each cylinder 230). A distribution or relative amounts of fuel delivered, injection timing, etc. may vary with operating conditions such as engine load, engine knock, exhaust temperature, etc. responsive to different operating or degradation states of fuel system 140, engine 110, etc.

Fuel system 140 may be a return-less fuel system, a return fuel system, or any one of various other types of fuel system. Fuel tank 144 may hold a fuel 224 including a plurality of fuel blends, e.g., fuel with a range of alcohol concentrations, such as gasoline, various gasoline-ethanol blends (including E10, E85), etc. A fuel level sensor 234 disposed in fuel tank 144 may provide an indication of the fuel level ("Fuel Level Input") to a controller 212 included in control system 190. As depicted, fuel level sensor 234 may include a float coupled to a variable resistor. Alternatively, other types of fuel level sensors may be used.

Vapors generated in fuel system 140 may be routed to an evaporative emissions control system 251 which includes a fuel vapor canister 222 via vapor recovery line 231, before being purged to the engine intake 223. Vapor recovery line 231 may be coupled to fuel tank 144 via one or more conduits and may include one or more valves for isolating the fuel tank during certain conditions. For example, vapor recovery line 231 may be coupled to fuel tank 144 via one or more or a combination of conduits 271, 273, and 275.

Further, in some examples, one or more fuel tank vent valves may be present in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 144 via a fuel filler pipe or neck 211. In some examples, fuel filler pipe 211 may include a flow meter sensor 220 operable to monitor a flow of fuel being supplied to fuel tank 144 via the fuel filler pipe (e.g., during refueling).

During refueling, fuel cap 205 may be manually opened or may be automatically opened responsive to a refueling request received at controller 212. A fuel dispensing device (e.g., 170) may be received by, and thereafter fluidically coupled to, refueling system 219, whereby fuel may be supplied to fuel tank 144 via fuel filler pipe 211. Refueling may continue until the fuel dispensing device is manually shut off or until fuel tank 144 is filled to a threshold fuel level (e.g., until feedback from fuel level sensor 234 indicates the threshold fuel level has been reached), at which point a mechanical or otherwise automated stop of the fuel dispensing device may be triggered. A pressure in the fuel system may be estimated via a fuel tank pressure sensor (FTPT) 291 coupled to the vapor recovery line 231 of the fuel tank 144.

Evaporative emissions control system 251 may include one or more fuel vapor containers or canisters 222 for capturing and storing fuel vapors. Fuel vapor canister 222 may be coupled to fuel tank 144 via at least one conduit 278 including at least one fuel tank isolation valve (FTIV) 252 for isolating the fuel tank during certain conditions. For example, during engine operation, FTIV 252 may be kept closed to limit the amount of diurnal or "running loss" vapors directed to canister 222 from fuel tank 144. During refueling operations and selected purging conditions, FTIV 252 may be temporarily opened, e.g., for a duration, to direct fuel vapors from the fuel tank 144 to canister 222. Further, FTIV 252 may also be temporarily opened when the fuel tank pressure is higher than a threshold (e.g., above a mechanical pressure limit of the fuel tank), such that fuel vapors may be released into the canister 222 and the fuel tank pressure is maintained below the threshold.

Evaporative emissions control system 251 may include one or more emissions control devices, such as fuel vapor canister 222 filled with an appropriate adsorbent, the fuel vapor canister being configured to temporarily trap fuel vapors (including vaporized hydrocarbons) during refueling operations. In one example, the adsorbent used may be activated charcoal. Evaporative emissions control system 251 may further include a canister ventilation path or vent line 227 which may route gases out of fuel vapor canister 222 to the atmosphere when storing, or trapping, fuel vapors from fuel system 140.

Fuel vapor canister 222 may include a buffer 222a (or buffer region), each of the fuel vapor canister and the buffer including the adsorbent. As shown, a volume of buffer 222a may be smaller than (e.g., a fraction of) a volume of fuel vapor canister 222. The adsorbent in buffer 222a may be the same as, or different from, the adsorbent in fuel vapor canister 222 (e.g., both may include charcoal). Buffer 222a may be positioned within fuel vapor canister 222 such that, during canister loading, fuel tank vapors may first be adsorbed within the buffer, and then when the buffer is saturated, further fuel tank vapors may be adsorbed in a remaining volume of the fuel vapor canister. In comparison, during purging of fuel vapor canister 222, fuel vapors may first be desorbed from the fuel vapor canister (e.g., to a threshold amount) before being desorbed from buffer 222a. In other words, loading and unloading of buffer 222a may not be linear with loading and unloading of fuel vapor canister 222. As such, one effect of buffer 222a is to dampen any fuel vapor spikes flowing from fuel tank 144 to fuel vapor canister 222, thereby reducing a possibility of any fuel vapor spikes going to engine 110.

In this example, a single fuel vapor canister 222 is shown, however, in alternate embodiments, there may be multiple fuel vapor canisters connected in series. Based on the arrangement of the canisters, they may be loaded in series, such as during canister loading, fuel tank vapors may first be first adsorbed within a first canister, and then when the first canister is saturated, further fuel tank vapors may be adsorbed in an adjoining second canister, and then when the first and second canisters are saturated, further fuel tank vapors may be adsorbed in an adjoining third canister.

In some examples, one or more temperature sensors 232 may be coupled to and/or within fuel vapor canister 222. As fuel vapor is adsorbed by the adsorbent in fuel vapor canister 222, heat may be generated (heat of adsorption). Likewise, as fuel vapor is desorbed by the adsorbent in fuel vapor canister 222, heat may be consumed. In this way, the adsorption and desorption of fuel vapor by fuel vapor canister 222 may be monitored and estimated based on temperature changes within the fuel vapor canister.

Vent line 227 may also allow fresh air to be drawn into fuel vapor canister 222 when purging stored fuel vapors from fuel system 140 to engine air intake system 223 via purge line 228 and purge valve 261. For example, purge valve 261 may normally be closed but may be opened during certain conditions so that vacuum from engine intake manifold 244 may be provided to fuel vapor canister 222 for purging. In some examples, vent line 227 may further include an air filter disposed therein downstream of fuel vapor canister 222.

Flow of air and vapors between fuel vapor canister 222 and the atmosphere may be regulated by a canister vent valve 229. Canister vent valve 229 may be a normally open valve, so that FTIV 252 may control venting of fuel tank 144 with the atmosphere. As described above, FTIV 252 may be positioned between fuel tank 144 and fuel vapor canister 222 within conduit 278. FTIV 252 may be a normally closed valve, that when opened, allows for venting of fuel vapors from fuel tank 144 to fuel vapor canister 222. Fuel vapors may then be vented to atmosphere via canister vent valve 229, or purged to engine air intake system 223 via canister purge valve 261.

In some examples, evaporative emissions control system 251 may further include an evaporative level check monitor (ELCM). ELCM may be disposed in vent line 227 and may be configured to control venting and/or assist in detection of undesired evaporative emissions. As an example, ELCM may include a vacuum pump for applying negative pressure to the fuel system when administering a test for undesired evaporative emissions. In some embodiments, the vacuum pump may be configured to be reversible. In other words, the vacuum pump may be configured to apply either a negative pressure or a positive pressure on the evaporative emissions control system 251 and fuel system 140. ELCM may further include a reference orifice, a pressure sensor, and a changeover valve (COV). A reference check may thus be performed whereby a vacuum may be drawn across the reference orifice, where the resulting vacuum level comprises a vacuum level indicative of an absence of undesired evaporative emissions. For example, following the reference check, the fuel system 140 and evaporative emissions control system 251 may be evacuated by the ELCM vacuum pump. In the absence of undesired evaporative emissions, the vacuum may pull down to the reference check vacuum level. Alternatively, in the presence of undesired evaporative emissions such as due to a leak in the EVAP system, the vacuum may not pull down to the reference check vacuum level.

Fuel system 140 may be operated by controller 212 in a plurality of modes by selective adjustment of the various valves and solenoids. For example, the fuel system may be operated in a fuel vapor storage mode (e.g., during a fuel tank refueling operation and with the engine not running), wherein the controller 212 may open fuel tank isolation valve (FTIV) 252 while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open FTIV 252, while maintaining canister purge valve 261 closed, to depressurize the fuel tank before allowing enabling fuel to be added therein. As such, FTIV 252 may be kept open during the refueling operation to allow refueling vapors to be stored in the canister. After refueling is completed, the FTIV may be closed. In some examples, there may be circumstances where the canister purge valve may be commanded open during refueling, such that a fluid flow in the intake may be monitored, to indicate a presence or absence of evaporative emissions system degradation.

As another example, the fuel system may be operated in a canister purging mode (e.g., after a given emission control device light-off temperature has been attained and with engine 110 running), wherein controller 212 may open canister purge valve 261 and canister vent valve 229 while closing FTIV 252. Herein, the vacuum generated by engine intake manifold 244 of (operating) engine 110 may be used to draw fresh air through vent line 227 and through fuel vapor canister 222 to purge stored fuel vapors into engine intake manifold 244. As such, in the canister purging mode, the purged fuel vapors from fuel vapor canister 222 may be combusted in engine 110. The canister purging mode may be continued until an amount or level of stored fuel vapors in fuel vapor canister 222 are below a threshold amount or level.

Over time and use, the fuel vapor canister 222 may be degraded or damaged and may need to be replaced. However, replacing such canisters may be considerably expensive. Therefore, in certain situations, after removing a faulted canister, instead of replacing the faulted canister with a working canister, to save parts costs, the EVAP system may be tampered with or altered (e.g. by a vehicle operator or vehicle technician) in such a way that there are no detectable leaks in the system. As an example, the canister may be replaced with a straight passage (connecting the fuel vapor line directly to atmosphere), which would allow fuel vapor to escape to the atmosphere during refueling when the FTIV 252 in opened. If a canister is replaced by a straight passage, a leak is not generated in the EVAP system, and therefore is not detectable via a diagnostic test such as an engine off natural vacuum test. Passing the engine off natural vacuum test may include, during an engine-off condition, the fuel tank pressure reaching either a first, higher pressure threshold during a pressure rise test or a second, lower pressure threshold during a vacuum test.

Once it is confirmed that there are no leaks in the EVAP system, presence or absence of the fuel vapor canister 222 may be detected during a refueling. During refueling, the change in the fuel tank pressure and a fuel fill level in a fuel tank may be monitored. A fuel fill rate may be estimated as a function of a time to fill a capacity of the fuel tank and the capacity of the fuel tank. A normalized fuel tank pressure may be estimated as a ratio of the fuel tank pressure to the fuel fill rate. Detection of the absence of the fuel vapor canister may be in response to the normalized fuel tank pressure being lower than a first threshold pressure within a first threshold duration. Since it has been confirmed that there are no leaks in the EVAP system, in this case, the detection of the absence of the fuel vapor canister includes detection of the fuel vapor canister being replaced by a straight line joining a purge line of the EVAP system to a vent line of the EVAP system. The presence of the fuel vapor canister may be detected in response to the normalized fuel tank pressure being higher than the first threshold pressure within the first threshold duration, the first threshold pressure pre-calibrated for the engine including an unused fuel vapor canister. Further, clogging of the fuel vapor canister may be indicated in response to the normalized fuel tank pressure being higher than each of the first threshold pressure and a second threshold pressure, the second threshold pressure higher than the first threshold pressure. The fuel vapor canister may be indicated to be functional in response to the normalized fuel tank pressure being higher than the first threshold pressure and lower than the second threshold pressure.

For EVAP systems including multiple canisters, a number of canisters missing may be indicated based on a difference between the normalized fuel tank pressure and the first threshold pressure, the number of canisters missing increasing with the difference between the normalized fuel tank pressure and the first threshold pressure increasing. As an example, if one canister is missing while two other canisters are functional, the difference between the normalized fuel tank pressure and the first threshold pressure may be lower than the difference between the normalized fuel tank pressure and the first threshold pressure if two canisters are missing. This difference may be compared to a look-up table stored in the controller memory to determine the number of canisters missing.

Control system 190, including controller 212, is shown receiving information from a plurality of sensors 216 (various examples of which are described herein) and sending control signals to a plurality of actuators 281 (various examples of which are described herein). As one example, sensors 216 may include one or more of exhaust gas sensor 237 located upstream of emission control device 270 in exhaust passage 235, temperature sensor 233 located downstream of emission control device 270 in exhaust passage 235, flow meter sensor 220 located in fuel filler pipe 211, fuel level sensor 234 located in fuel tank 144, fuel tank pressure sensor 291 coupled to the fuel vapor recovery line 231 (or within the fuel tank 144), and temperature sensor 232 located in fuel vapor canister 222. Other sensors such as pressure, temperature, air/fuel ratio, and composition sensors may be coupled to various locations in vehicle system 206. As an additional or alternative example, actuators 281 may include fuel injector 266, throttle 262, FTIV 252, canister purge valve 261, and canister vent valve 229. Controller 212 may receive input data from sensors 216, process the input data, and trigger actuators 281 in response to the processed input data based on instructions or code programmed in non-transitory memory therein, the instructions or code corresponding to one or more control routines. For example, during a vehicle off condition or during a refueling event, control system 190 may be configured to monitor a fuel level of fuel tank 144 and the amount of fuel supplied to the fuel tank.

Turning to FIGS. 3A-3B, schematic diagrams of the evaporative emission control system of FIG. 2 are shown, which has been altered instead of replacing a faulted fuel vapor canister 222. FIG. 3A shows an EVAP system indicating tampering or alteration that causes a large detectable leak, while FIG. 3B shows an EVAP system indicating tampering or alteration that causes an undetectable degradation. FIGS. 3A-3B are described herein collectively. As such, components previously introduced in FIG. 2 are numbered similarly in FIGS. 3A-3B and not reintroduced for brevity.

In FIG. 3A, an example view 300 shows evaporative emission control system 251 and fuel system 140 of the vehicle system 206, where the fuel system 140 is disconnected from the evaporative emission control system 251. In the illustrated example, the altered state of the evaporative emission control system 251 includes a missing fuel vapor canister with the conduit 278, vent line 227 and purge line 228 disconnected. For example, a damaged or degraded fuel vapor canister may simply be disconnected from the fuel tank of the fuel system 140 and may be removed with the connections left open to atmosphere causing a large leak in the EVAP system. In the illustrated example, an arrow 302 shows the altered condition of the evaporative emission control system 251 with the fuel vapor canister removed. As a result, the vehicle's onboard diagnostics or an EVAP leak monitor detects a large leak and sets a malfunction indicator lamp (MIL). An example method for detection of a leak in the EVAP system which may be caused due to the absence of the fuel vapor canister is described in FIG. 4.

In some instances, a straight tube may be installed as a defeat device in the evaporative emission control system of a vehicle in lieu of a fuel vapor canister to prevent leak detection by EVAP leak monitor. In FIG. 3B, an example view 350 shows evaporative emission control system 251 and fuel system 140 of the vehicle system 206, where the fuel system 140 is connected to the evaporative emission control system 251 via a straight tube 352. In the illustrated example, the altered state of the evaporative emission control system 251 includes a missing fuel vapor canister with the conduit 278, vent line 227 and purge line 228 connected via the straight tube 352. The straight tube 352 replaces the damaged or degraded fuel vapor canister. As a result of this alteration or tampering of the evaporative emission control system, the vehicle may false pass an emissions test causing an undetectable leak, as this will not set the malfunction indicator lamp (MIL). For EVAP systems with multiple canisters, one or more canisters may be removed and replaced with straight tubes. However, in such an example vehicle, during refueling, as FTIV 252 is opened, fuel vapors from the vapor recovery line 231 and the fuel tank 144 may be released to the atmosphere via the straight tube 352 and the vent line 227, thereby leading to increased evaporative emission levels. Example methods for detection of missing canister(s) in the EVAP system which were replaced by straight tubes are described in FIGS. 5-6.

Figure 4:
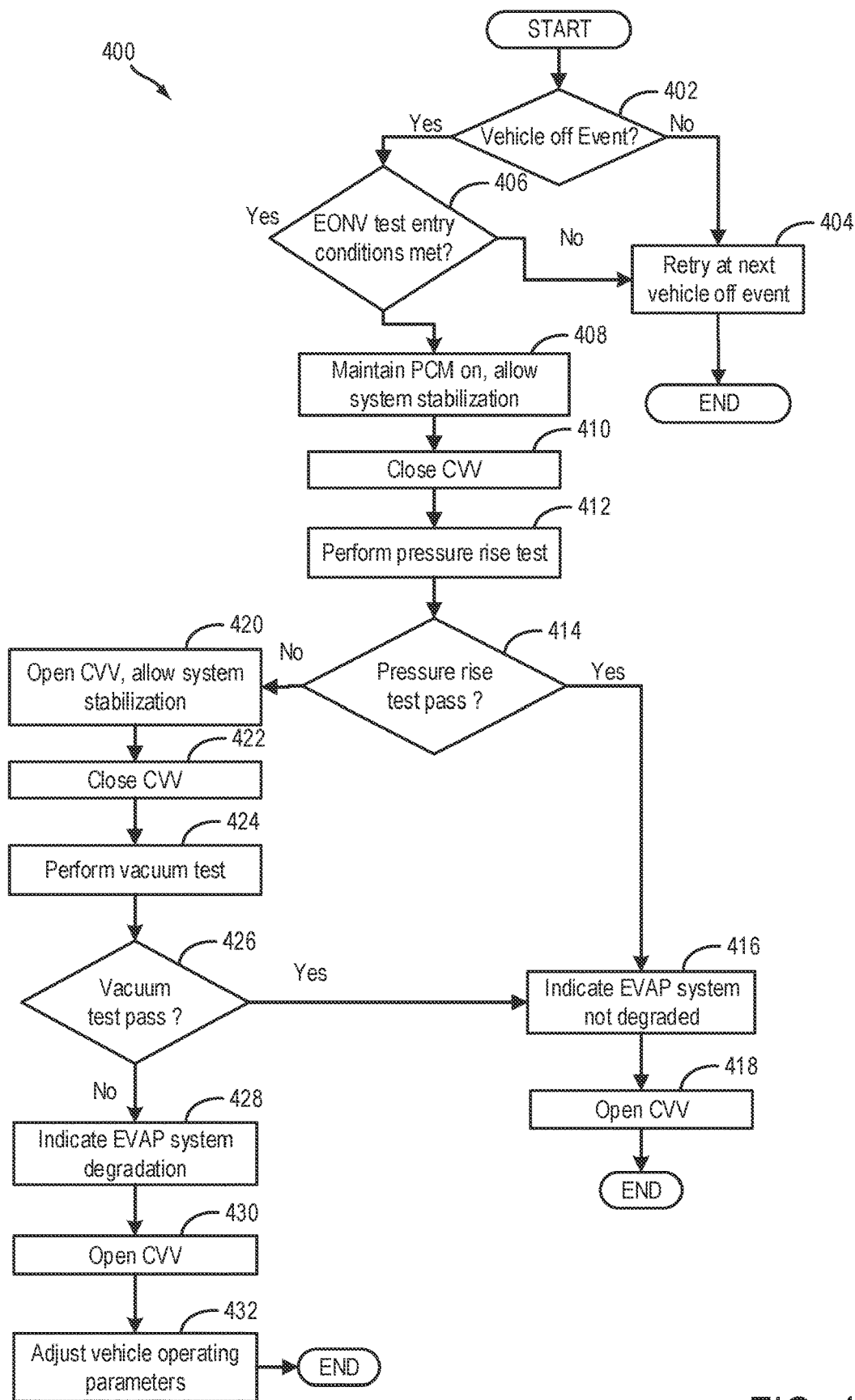
FIG. 4 shows a flow chart of an example method for detecting leaks in the evaporative emission control system of FIG. 2.

In this way, the components described in FIGS. 1-3B enable an evaporative emissions control (EVAP) system coupled to a fuel system, the EVAP system including at one or more fuel vapor canisters, a controller storing instructions in non-transitory memory that, when executed, cause the controller to: during refueling, estimate a fuel fill level in a fuel tank via a fuel level sensor, estimate a fuel tank pressure via a fuel tank pressure sensor, estimate a fuel fill rate as a function of a time to fill the fuel tank to capacity, estimate a normalized fuel tank pressure as a function of the estimated fuel tank pressure and the fuel fill rate, and indicate one or more fuel vapor canisters missing based on the normalized fuel tank pressure being lower than a first threshold pressure, FIG. 4 shows an example method 400 that may be implemented for detecting leaks in the evaporative emission control system (such as EVAP system 251 in FIG. 2). In one example, the leak may be caused by removal of a defective fuel vapor canister (such as canister 222 in FIG. 2) as shown in FIG. 3A. In this example, an engine-off natural vacuum (EONV) test is shown to detect EVAP system leaks, however, other suitable EVAP system diagnostics test may also be carried out to detect EVAP system leaks such as caused by removal of the canister. Instructions for carrying out method 400 and the rest of the methods included herein may be executed by a controller based on instructions stored on a memory of the controller and in conjunction with signals received from sensors of the engine system, such as the sensors described above with reference to FIGS. 1-3B. The controller may employ engine actuators of the engine system to adjust engine operation, according to the methods described below.

At 402, method 400 includes determining whether a vehicle-off event has occurred. The vehicle-off event may include an engine-off event, and may be indicated by other events, such as a key-off event. The vehicle off event may be indicated by suspension of engine operation followed by the key-off. If no vehicle-off event is detected, method 400 proceeds to 404. At 404, method 400 includes recording that an EONV test was not executed, and further includes setting a flag to retry the EONV test at the next detected vehicle-off event. Method 400 then ends.

If a vehicle-off event is detected, method 400 proceeds to 406. At 406, method 400 includes determining whether entry conditions for an EONV test are met. For an engine-off natural vacuum test, the engine needs to be at rest with all cylinders off, as opposed to engine operation with the engine rotating, even if one or more cylinders are deactivated. Further entry conditions may include a threshold amount of time passed since the previous EONV test, a threshold length of engine run time prior to the engine-off event, a threshold amount of fuel in the fuel tank, and a threshold battery state of charge. The threshold length of engine run time may be based on pre-calibrated duration of engine operation for engine heating. If the engine is operated for a duration shorter than the threshold length of engine run time, the engine may not be sufficiently warm at the vehicle off event for EONV test to be successful. If entry conditions are not met, method 300 proceeds to 404 where the flag may be set to retry the EONV test at the next detected vehicle-off event. Method 400 then ends.

Although entry conditions may be met at the initiation of method 400, conditions may change during the execution of the method. For example, an engine restart or refueling event may be sufficient to abort the method at any point prior to completing method 400. If such events are detected that would interfere with the performing of method 400 or the interpretation of results derived from executing method 400, method 400 may proceed to 404, record that an EONV test was aborted, and set a flag to retry the EONV test at the next detected vehicle-off event, and then end.

If entry conditions are met for carrying out an EONV test, method 400 proceeds to 408. At 408, the PCM may be maintained in an on condition following the vehicle off condition. In this way, the method may continue to be carried out by a controller, such as controller 212, and the EONV test may be initiated. 408 of method 400 further includes allowing the fuel system to stabilize following the vehicle and engine off condition. Allowing the fuel system to stabilize may include waiting for a period of time before method 400 advances. The stabilization period may be a pre-determined amount of time, or may be an amount of time based on current operating conditions. The stabilization period may be based on the predicted ambient conditions. In some examples, the stabilization period may be characterized as the length of time necessary for consecutive measurements of a parameter to be within a threshold of each other. For example, fuel may be returned to the fuel tank from other fuel system components following an engine off condition. The stabilization period may thus end when two or more consecutive fuel level measurements are within a threshold amount of each other, signifying that the fuel level in the fuel tank has reached a steady-state. In some examples, the stabilization period may end when the fuel tank pressure is equal to atmospheric pressure. Following the stabilization period, method 400 then proceeds to 410.

At 410, a canister vent valve (such as CVV 229 in FIG. 2) may be actuated to a closed position. Additionally or alternatively, a fuel tank isolation valve (such as FTIV 252 in FIG. 2) may be actuated to a closed position. In this way, the fuel tank may be isolated from atmosphere. The status of a canister purge valve (such as CPV 261 in FIG. 2) and/or other valves coupled within a conduit connecting the fuel tank to atmosphere may also be assessed and closed if open.

At 412, a pressure rise test may be performed. While the engine is still cooling down post shut-down, there may be additional heat rejected to the fuel tank. With the fuel system sealed via the closing of the CVV, the pressure in the fuel tank may rise due to fuel volatizing with increased temperature. The pressure rise test may include monitoring fuel tank pressure for a period of time. Fuel tank pressure may be monitored until the pressure reaches the adjusted threshold, the adjusted threshold pressure indicative of no leaks above a threshold size in the fuel tank. In some examples, the rate of pressure change may be compared to an expected rate of pressure change. The fuel tank pressure may not reach the threshold pressure. Rather, the fuel tank pressure may be monitored for a predetermined amount of time, or an amount of time based on the current conditions. The fuel tank pressure may be monitored until consecutive measurements are within a threshold amount of each other, or until a pressure measurement is less than the previous pressure measurement. The fuel tank pressure may be monitored until the fuel tank temperature stabilizes.

At 414, method 400 includes determining whether the pressure rise test ended due to a passing result, such as the fuel tank pressure reaching a first pressure threshold. The first pressure threshold may be calibrated based on one or more of fuel level, engine temperature at engine-off, fuel tank capacity, ambient temperature, etc. If the pressure rise test resulted in a passing result, it may be inferred that there are no leaks in the EVAP system. At 416, method 400 includes indicating the passing test result that the EVAP system is not degraded. Indicating the passing result may include recording the successful outcome of the leak test at the controller. It may be confirmed that the fuel vapor canister is in place and has not been removed causing a leak in the EVAP system. At 418, upon completion of the EONV test, the CVV may be actuated to an open position. In this way, the fuel system pressure may be returned to atmospheric pressure. The evaporative emissions leak test schedule may be updated. For example, scheduled leak tests may be delayed or adjusted based on the passing test result. Method 400 then ends.

If a passing result is not indicated based on the first pressure threshold, method 400 proceeds to 420. At 420, the CVV may be opened and the system may be allowed to stabilize. Opening the CVV allows the fuel system pressure to equilibrate to atmospheric pressure. The system may be allowed to stabilize until the fuel tank pressure reaches atmospheric pressure, and/or until consecutive pressure readings are within a threshold of each other. Method 400 then proceeds to 422.

At 422, the CVV may be actuated to a closed position. In this way, the fuel tank may be isolated from atmosphere. As the fuel tank cools, the fuel vapors should condense into liquid fuel, generating a vacuum within the sealed tank. At 424, a vacuum test may be performed. Performing a vacuum test may include monitoring fuel tank pressure for a duration. Fuel tank pressure may be monitored until the vacuum reaches the adjusted threshold, the adjusted threshold vacuum indicative of no leaks above a threshold size in the fuel tank. In some examples, the rate of pressure change may be compared to an expected rate of pressure change. The fuel tank pressure may not reach the threshold vacuum. Rather, the fuel tank pressure may be monitored for a predetermined duration, or a duration based on the current conditions.

At 426, method 400 includes determining whether a passing result was indicated for the vacuum test based on the fuel tank pressure reaching a second pressure threshold. The second pressure threshold may be calibrated based on one or more of fuel level, engine temperature at engine-off, fuel tank capacity, ambient temperature, etc. If a passing result is indicated, it may be inferred that there are no leaks in the EVAP system and the method may proceed to 416. At 416, method 400 includes indicating the passing test result that the EVAP system is not degraded. The method may then end.

Returning to 426, if the vacuum test did not result in a passing result (and also the pressure rise test did not pass), it may be inferred that there is a leak in the EVAP system. At 428, method 400 includes recording the failing test result. Indicating fuel tank degradation may include setting a flag at the controller and activating an MIL to indicate the vehicle operator of the presence of EVAP system degradation. Indicating the failing result may include recording the unsuccessful outcome of the leak test at the controller. The leak may be due to the fuel vapor canister being removed and not replaced by a working canister (or a straight tube). At 430, upon completion of the EONV test, the CVV may be actuated to the open position. In this way, the fuel system pressure may be equilibrated to atmospheric pressure.

In response to the detection of degradation, one or more engine operating parameters. Adjusting engine operating parameters may include adjusting a maximum engine load to reduce fuel consumption, adjusting a commanded A/F ratio, increasing vehicle operation in battery-only mode. Method 400 may then end.

Figure 5:
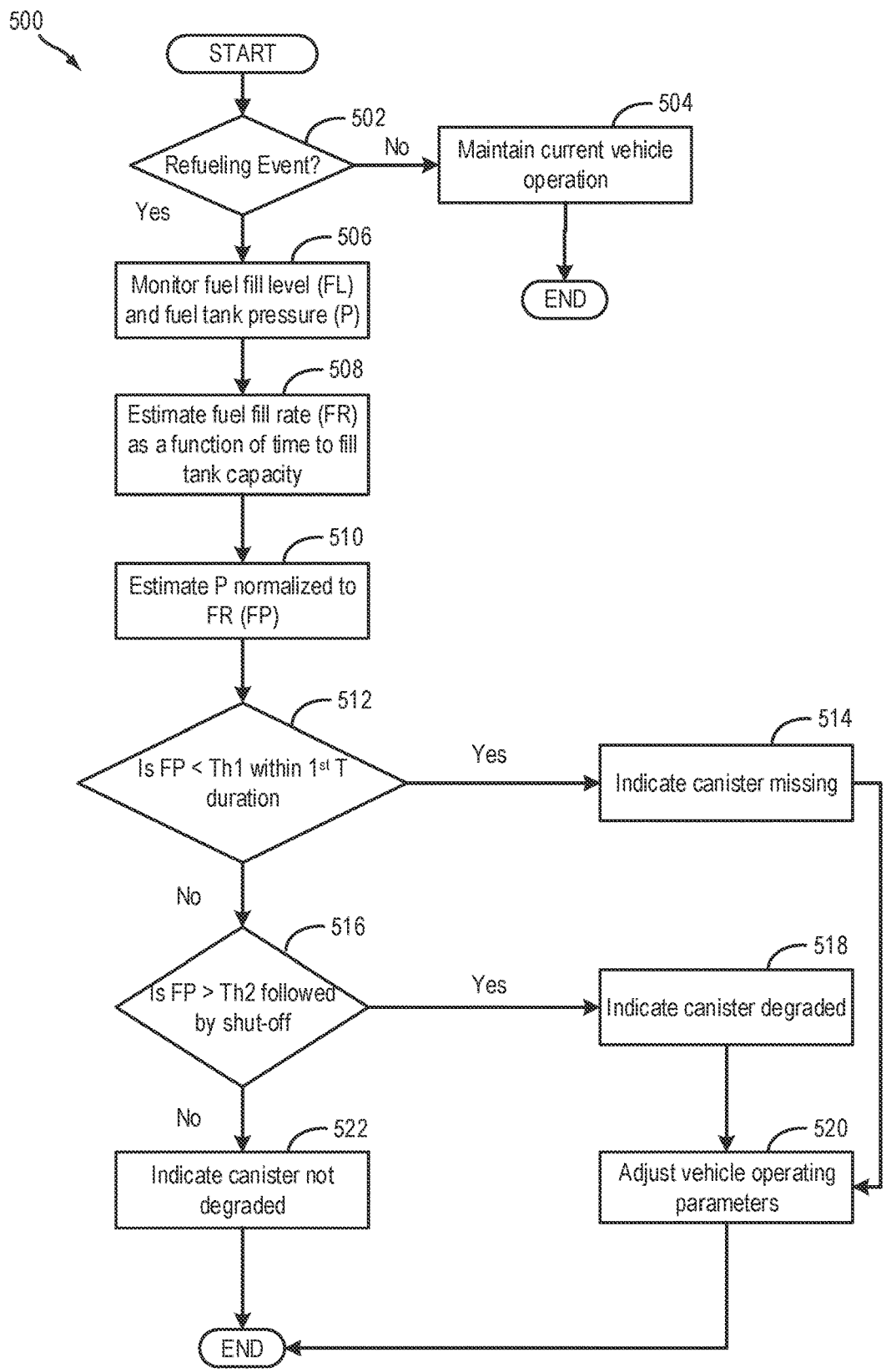
FIG. 5 shows a flow chart of an example method for detecting tampering or degradation in the evaporative emission control system of FIG. 2.

FIG. 5 shows an example method 500 that may be implemented for detecting tampering or degradation in the evaporative emission control system (such as EVAP system 251 in FIG. 2). In one example, the tampering may include removal of a defective fuel vapor canister (such as canister 222 in FIG. 2) and replacement of the canister with a straight tube as shown in FIG. 3B. Since the canister is replaced with a straight tube, there is no leak in the EVAP system and therefore degradation of the EVAP system may not be detectable by the EONV test describe din FIG. 4. Method 500 may be carried out upon confirmation that the EVAP system is not degraded based on the diagnostic method 400 of FIG. 4. Method 500 may be carried out to detect replacement of the canister by a straight line in EVAP systems including only one fuel vapor canister.

At 502, method 500 may include determining whether a refueling event has initiated. In some examples, the refueling event may be determined to be initiated when a fuel level of the fuel tank (e.g., 144) increases at a higher than threshold rate for a threshold duration. In other examples, the refueling event may be determined to be initiated responsive to a signal received from an external fuel pump via the wireless network (e.g., 131) indicating that the external fuel pump has started dispensing fuel to the vehicle. In other examples, the refueling event may be determined to be initiated responsive to the fuel dispensing device (e.g., 170) being fluidically coupled to the refueling system (e.g., 219) of the vehicle. An upcoming refueling event may be predicted based on indication from an on-board navigation system that the vehicle is parked at a gas station. During refueling a fuel tank isolation valve (such as FTIV 252 in FIG. 2) may be actuated to an open position to allow fuel vapor from the fuel vapor recovery line and the fuel tank to be routed to the fuel vapor canister, wherein the vapor may be stored and later purged to the engine intake manifold.

If it is determined that the refueling event has not been initiated, at 504, current vehicle operation may be continued. Specifically, combustion of fuel in cylinders (e.g., 230) of the engine (e.g., 110) may continue and the vehicle may operate without interruption. Further, diagnosis of the evaporative emission control system may not be attempted again at least until a next refueling event is successfully initiated. Alternatively, if it is determined that the refueling event has initiated, method 500 may proceed to 506.

At 506, during the refueling, a change in fuel level (FL) in the fuel tank may be monitored based on an output of a fuel level sensor (such as fuel level sensor 234 in FIG. 2). As the refueling continues, pressure at the fuel tank may change, and the change in fuel tank pressure (P) may be monitored based on output of a fuel tank pressure sensor (such as FTPT 291 in FIG. 2). At 508, a fuel fill rate (FR) may be estimated (such as in gallons per minute) as a function of time to fill the capacity of the tank and a capacity of the tank. The capacity of the tank may be stored in controller memory and the controller may estimate the time taken for the fuel level to reach the capacity of the tank during the refueling.

At 510, during the refueling, the fuel tank pressure (P) may be normalized relative to fuel fill rate to estimate normalized fuel tank pressure (FP). In one example, FP may be a ratio of P and FR. During refueling, P may increase initially and then reach a plateau, the pressure plateau attained during the refueling based on the fuel fill rate.

At 512, the routine includes determining if the normalized fuel tank pressure (FP) is lower than a first threshold pressure (Th1) within a first threshold duration ($1^{st}$ T duration). The first threshold pressure and the first threshold duration may be pre-calibrated during refueling of a new vehicle with a functional fuel vapor canister. In one example, the first duration may be in a range of 2-5 seconds.

As the fuel vapors generated during refueling enters the fuel vapor canister, a back pressure may be generated due to the resistance provided by the canister. This back pressure may increase the FP.

If it is determined that FP is lower than the first threshold pressure within the first threshold duration, it may be inferred that the expected back pressure from the canister during refueling is absent. In the absence of the fuel vapor canister such as if the canister is replaced by a straight tube, the refueling vapors may escape to the atmosphere without any back pressure which may result in a lower FP. Therefore, at 514, the method includes indicating that the fuel vapor canister is missing. Since it was confirmed by method 400 in FIG. 4 that there are no detectable leaks in the EVAP system, it may be inferred that the canister may have been removed and replaced by a straight tube connecting the fuel vapor recovery line to the vent line of the EVAP system. In some examples, a generated driver indication may be displayed to the vehicle operator (e.g., 102) at a vehicle instrument panel (e.g., 196) or other display visible to the vehicle operator. In such examples, the driver indication may indicate an absence of the fuel vapor canister, in addition to instructions for repair or recommendations as to installation of the canister. The driver indication may include lighting a malfunction indicator lamp (MIL) and a corresponding diagnostic code may be set and stored in the memory of the engine controller. In one example, lighting the MIL may indicate a request that the vehicle be taken to a service technician, and the diagnostic code that is set may indicate to the service technician that the fuel vapor canister is missing. The light and the code may reset after the vehicle has been serviced and the fuel vapor canister has been installed.

In response to the detection of a missing canister, at 520, one or more vehicle operating parameters may be adjusted to mitigate the escape of untreated fuel vapors to the atmosphere. For example, one or more of the engine operating parameters such as engine load and speed may be altered or adjusted (e.g., minimized, maintained below respective thresholds, lowered to near or at zero, etc.). Additionally or alternatively, the engine controller may command the vehicle enter an electric drive mode, where only a motor (e.g., 120) may propel drive wheels (e.g., 130) of the vehicle so that the fueling system (e.g., 140) is not relied upon to power the engine (e.g., 110). By not operating the fuel pump, generation of fuel vapor may be reduced. The one or more vehicle operating parameters may remain altered or adjusted until servicing of the evaporative emission control system may be performed and installation of a functional fuel vapor canister may be completed.

Returning to step 512, if it is determined that FP is higher than the first threshold pressure within the first threshold duration, at 516, the routine includes determining if the FP is higher than a second threshold pressure (Th2) within the first threshold duration followed by a fueling shut-off prior to the desired fill level being attained. The second threshold pressure may be pre-calibrated during refueling of a new vehicle with a functional and clean (unused) fuel vapor canister. If the canister is present but not clean, fuel vapor during refueling may not enter the canister causing the fuel tank pressure to increase rapidly. Due to sudden increase in fuel tank pressure, the refueling may be abruptly shut off repeatedly.

If it is determined that the FP is higher than second threshold pressure within the first threshold duration followed by the fueling being shut-off prior to the desired fill level being attained, it may be inferred that the fuel tank pressure has increased rapidly due to very high back pressures. The very high back pressure may be generated by a plugged/clogged canister that is incapable of further fuel vapor adsorption. If a purge of the canister was carried out prior to the refueling, it may be confirmed that the canister is degraded. At 518, a diagnostic code may be set indicating degradation of the canister. A MIL may be set requesting the operator to service or replace the canister. In response to the canister begin degraded, at 520, one or more vehicle operating parameters may be adjusted (as described previously). In case of a degraded but present canister, the purge frequency may be increased to ensure some degree of cleaning of the canister until the canister is serviced.

Returning to 516, if it is determined that the FP is lower than Th2 within the first threshold duration and it was previously determined that FP is higher than Th1 within the first threshold duration, it may be inferred that FP is following an expected trend during refueling such as increase in FP followed by a plateau. At 522, the method includes indicating that the canister is not degraded and there are no degradation/tampering/leaks in the EVAP system. The diagnostic routine may then end.

FIG. 6 shows an example method 600 that may be implemented for detecting tampering or degradation in the evaporative emission control system (such as EVAP system 251 in FIG. 2) including multiple fuel vapor canisters. In this example, three fuel vapor canisters are described but this method may be adjusted for diagnostics of EVAP system with any number of multiple canisters. In one example, the tampering may include removal of one or more of the multiple canisters and replacement of the removed canister(s) with straight tube(s). Since the canisters are replaced with straight tubes, there is no leak in the EVAP system and therefore degradation of the EVAP system may not be detectable by the EONV test describe din FIG. 4. Method 600 may be carried out upon confirmation that the EVAP system is not degraded based on the diagnostic method 400 of FIG. 4. Method 600 may be carried out to detect replacement of one or more canisters by straight tubes in EVAP systems including multiple fuel vapor canisters.

At 602, method 600 may include determining whether a refueling event has initiated. In some examples, the refueling event may be determined to be initiated when a fuel level of the fuel tank (e.g., 144) increases at a higher than threshold rate for a threshold duration. In other examples, the refueling event may be determined to be initiated responsive to a signal received from an external fuel pump via the wireless network (e.g., 131) indicating that the external fuel pump has started dispensing fuel to the vehicle. In other examples, the refueling event may be determined to be initiated responsive to the fuel dispensing device (e.g., 170) being fluidically coupled to the refueling system (e.g., 219) of the vehicle. An upcoming refueling event may be predicted based on indication from an on-board navigation system that the vehicle is parked at a gas station. During refueling a fuel tank isolation valve (such as FTIV 252 in FIG. 2) may be actuated to an open position to allow fuel vapor from the fuel vapor recovery line and the fuel tank to be routed to the fuel vapor canisters wherein the vapor may be stored and later purged to the engine intake manifold. The fuel vapor canisters may be coupled in series such that the vapors may be first routed to a first canister, upon the first canister being saturated, the fuel vapors may be routed to a second canister, and then upon the second canister being saturated, the fuel vapors may be routed to a third canister.

If it is determined, that the refueling event has not initiated, at 604, current vehicle operation may be continued.

Specifically, combustion of fuel in cylinders (e.g., 230) of the engine (e.g., 110) may continue and the vehicle may operate without interruption. Further, diagnosis of the evaporative emission control system may not be attempted again at least until a next refueling event is successfully initiated. Alternatively, if it is determined that the refueling event has initiated, method 600 may proceed to 606.

At 606, during the refueling, a change in fuel level (FL) in the tank may be monitored based on an output of a fuel level sensor (such as fuel level sensor 234 in FIG. 2). As the refueling continues, pressure at the fuel tank may change, and the change in fuel tank pressure (P) may be monitored based on output of a fuel tank pressure sensor (such as FTPT 291 in FIG. 2). At 608, a fuel fill rate (FR) may be estimated (such as in gallons per minute) as a function of time to fill the capacity of the tank and a capacity of the tank. The capacity of the tank may be stored in controller memory and the controller may estimate the time taken for the fuel level to reach the capacity of the tank during the refueling.

At 610, the fuel tank pressure (P) may be normalized relative to fuel fill rate to estimate normalized fuel tank pressure (FP). In one example, FP may be a ratio of P and FR. During refueling, P may increase initially and then reach a plateau, the pressure plateau attained during the refueling based on the fuel fill rate.

At 612, the routine includes determining if the normalized fuel tank pressure (FP) is lower than a third threshold pressure (Th3) within a first threshold duration ($1^{st}$ T duration). The third threshold pressure and the first threshold duration may be pre-calibrated during refueling of a new vehicle with one functional fuel vapor canister. In one example, the first duration may be in a range of 2-5 seconds. As the fuel vapors generated during refueling enters the fuel vapor canisters, a back pressure may be generated due to the resistance provided by the canisters. This back pressure may increase the FP. The higher the number of canisters present, the higher is the backpressure.

If it is determined that FP is lower than the third threshold pressure within the first threshold duration, it may be inferred that the expected back pressure from even one canister during refueling is absent. In the absence of any fuel vapor canister such as if all the canisters are replaced by straight tubes, the refueling vapors may escape to the atmosphere without any back pressure which may result in a lower FP. Therefore, at 614, the method includes indicating that all the fuel vapor canisters are missing. Since it was confirmed by method 400 in FIG. 4 that there are no detectable leaks in the EVAP system, it may be inferred that each of the canisters may have been removed and replaced by a straight tube, respectively. In some examples, a generated driver indication may be displayed to the vehicle operator (e.g., 102) at a vehicle instrument panel (e.g., 196) or other display visible to the vehicle operator. In such examples, the driver indication may indicate an absence of any of the fuel vapor canisters, in addition to instructions for repair or recommendations as to installation of the canisters. The driver indication may include lighting a malfunction indicator lamp (MIL) and a corresponding diagnostic code may be set and stored in the memory of the engine controller. In one example, lighting the MIL may indicate a request that the vehicle be taken to a service technician, and the diagnostic code that is set may indicate to the service technician that the fuel vapor canisters are missing. The light and the code may reset after the vehicle has been serviced and the fuel vapor canisters have been installed.

In response to the detection of each of the canisters missing, at 624, one or more vehicle operating parameters may be adjusted to mitigate the escape of untreated fuel vapors to the atmosphere. For example, one or more of the engine operating parameters such as engine load and speed may be altered or adjusted (e.g., minimized, maintained below respective thresholds, lowered to near or at zero, etc.). Additionally or alternatively, the engine controller may command the vehicle enter an electric drive mode, where only a motor (e.g., 120) may propel drive wheels (e.g., 130) of the vehicle so that the fueling system (e.g., 140) is not relied upon to power the engine (e.g., 110). By not operating the fuel pump, generation of fuel vapor may be reduced. The one or more vehicle operating parameters may remain altered or adjusted until servicing of the evaporative emission control system may be performed and installation of a functional fuel vapor canister may be completed.

Returning to step 612, if it is determined that FP is higher than the third threshold pressure within the first threshold duration, at 616, the routine includes determining if the FP is lower than a fourth threshold pressure (Th4) while being higher than the third threshold pressure (Th3) within the first threshold duration. The fourth threshold pressure may be pre-calibrated during refueling of a new vehicle with two functional fuel vapor canisters. If it is determined that FP is lower than the fourth threshold pressure and higher than the third threshold pressure within the first threshold duration, it may be inferred that the expected back pressure from two or more canisters during refueling is absent and the back pressure generated is from a single canister. In the absence of one or more fuel vapor canisters such as if the missing canisters are replaced by straight tubes, the refueling vapors may escape to the atmosphere without contributing to back pressure which may result in a lower FP. Therefore, at 618, the method includes indicating that two fuel vapor canisters are missing. Since it was confirmed by method 400 in FIG. 4 that there are no detectable leaks in the EVAP system, it may be inferred that the two canisters may have been removed and replaced by a straight tube, respectively. The routine may then proceed to step 624.

Returning to step 616, if it is determined that FP is higher than the fourth threshold pressure within the first threshold duration, at 620, the routine includes determining if the FP is lower than a fifth threshold pressure (Th5) while being higher than the fourth threshold pressure (Th4) within the first threshold duration. The fifth threshold pressure may be pre-calibrated during refueling of a new vehicle with all three functional fuel vapor canisters. If it is determined that FP is lower than the fifth threshold pressure and higher than the fourth threshold pressure within the first threshold duration, it may be inferred that the expected back pressure from one canister during refueling is absent and the back pressure generated is from two canisters (instead of the expected three). In the absence of two fuel vapor canisters such as if the missing canisters are replaced by straight tubes, the refueling vapors may escape to the atmosphere without contributing to back pressure which may result in a lower FP. Therefore, at 622, the method includes indicating that one fuel vapor canister is missing. Since it was confirmed by method 400 in FIG. 4 that there are no detectable leaks in the EVAP system, it may be inferred that one canister may have been removed and replaced by a straight tube. The routine may then proceed to step 624.

Returning to step 620, if it is determined that FP is higher than the fifth threshold pressure within the first threshold duration, at 626, the routine includes determining if the FP is higher than a sixth threshold pressure (Th6) within the first threshold duration followed by a fueling shut-off prior to the desired fill level being attained. The sixth threshold pressure may be pre-calibrated during refueling of a new vehicle with three functional and clean fuel vapor canisters. If the canisters are present but not clean, fuel vapor during refueling may not enter the canisters causing the fuel tank pressure to increase rapidly. Due to sudden increase in fuel tank pressure, the refueling may be abruptly shut off repeatedly.

If it is determined that the FP is higher than sixth threshold pressure within the first threshold duration followed by the fueling being shut-off prior to the desired fill level being attained, it may be inferred that the fuel tank pressure has increased rapidly due to very high back pressures. The very high back pressure may be generated by plugged/clogged canisters that are incapable of further fuel vapor adsorption. The clogging may be in in or more of the three canisters. If a purge of the canisters was carried out prior to the refueling, it may be confirmed that one or more canisters are degraded. At 628, a diagnostic code may be set indicating degradation of the canisters. A MIL may be set requesting the operator to service or replace one or more canisters. In response to the canisters begin degraded, at 624, one or more vehicle operating parameters may be adjusted (as described previously). In case of a degraded but present canisters, the purge frequency may be increased to ensure some degree of cleaning of the canisters until the canisters are serviced.

Returning to 626, if it is determined that the FP is lower than Th6 within the first threshold duration and it was previously determined that FP is higher than Th5 within the first threshold duration, it may be inferred that FP is following an expected trend during refueling such as increase in FP to a pre-calibrated level followed by a plateau. At 630, the method includes indicating that the canisters are not degraded and there are no degradation/tampering/leaks in the EVAP system. The diagnostic routine may then end.

FIG. 7 shows a plot 700 of change in fuel tank pressure relative to the fill rate during refueling for detection of tampering or degradation in the evaporative emission control system including three fuel vapor canisters, as shown in method 600 of FIG. 6. The plot 702 denotes a change in fuel level in the fuel tank over time during a refueling event. The second plot, line 704, denotes a first pre-calibrated plot of normalized fuel tank pressure (FP) estimated as the fuel tank pressure (P) normalized relative to fuel fill rate for an EVAP system including three functional canisters. The third plot, line 706, denotes a second pre-calibrated plot of normalized fuel tank pressure (FP) estimated as the fuel tank pressure (P) normalized relative to fuel fill rate for an EVAP system including two functional canisters (one canister removed). The fourth plot, line 708, denotes a third pre-calibrated plot of normalized fuel tank pressure (FP) estimated as the fuel tank pressure (P) normalized relative to fuel fill rate for an EVAP system including one functional canister (two canisters removed). The fifth plot, line 710, denotes a fourth pre-calibrated plot of normalized fuel tank pressure (FP) estimated as the fuel tank pressure (P) normalized relative to fuel fill rate for an EVAP system with all canisters removed.

During refueling, the normalized fuel tank pressure (FP) may be estimated and compared to each of the four pre-calibrated plots (lines 704, 706, 708, and 710). If the estimated FP is higher than or equal to the first pre-calibrated plot 704, it may be inferred that all the canisters are present. If the estimated FP is higher than or equal to the second pre-calibrated plot 706 but lower than the first pre-calibrated plot 704, it may be inferred that one canister has been removed (two remain intact). If the estimated FP is higher than or equal to the third pre-calibrated plot 708 but lower than the second pre-calibrated plot 706, it may be inferred that two canisters have been removed. If the estimated FP is higher than or equal to the fourth pre-calibrated plot 710 but lower than the third pre-calibrated plot 708, it may be inferred that all canisters have been removed. In this way, removal of one or more canisters may be selectively diagnosed.

In this way, during a refueling, absence of one or more fuel vapor canisters in an evaporative emissions control (EVAP) system may be indicated based on a comparison of a normalized fuel tank pressure to one or more threshold pressure levels. The indicating absence of one or more fuel vapor canisters includes, indicating absence of all fuel vapor canister in response to the normalized fuel tank pressure being lower than a first threshold pressure. Further, the indicating absence of one or more fuel vapor canisters includes, indicating absence of two fuel vapor canisters in response to the normalized fuel tank pressure being higher than the first threshold pressure but lower than a second threshold pressure, and indicating absence of three fuel vapor canisters in response to the normalized fuel tank pressure being higher than the second threshold pressure but lower than a third threshold pressure, the first threshold pressure is lower than the second threshold pressure and the second threshold pressure is lower than the third threshold pressure.

FIG. 8 shows example timeline 800 for a diagnostics routine of the evaporative emission control system of a vehicle including a single fuel vapor canister (such as canister 222 in FIG. 8). The horizontal (x-axis) denotes time and the vertical markers t1-t4 identify significant times in the diagnostics of the EVAP system.

The first plot, line 802, indicates a state of an engine of the vehicle system (e.g., the engine 110 of the vehicle system 206 of FIG. 2), which may be in an ON state or an OFF state. The second plot, line 804, indicates refueling of a fuel tank (e.g., the fuel tank 144 of FIG. 4A), where YES indicates that the fuel tank is being refueled and NO indicates that the fuel tank is not being refueled. The third plot, line 806, indicates a state of a canister purge valve (e.g., CPV 261 of FIG. 2), which may be in an OPEN position or a CLOSED position. The fourth plot, line 808 indicates a state of a fuel tank isolation valve (e.g., FTIV 252 of the vehicle system 206 of FIG. 2), which may be in an OPEN position or a CLOSED position. The fifth plot, line 810, indicates fuel level increase in the fuel tank. The sixth plot, line 812, indicated an estimated normalized fuel tank pressure (FP) estimated as the fuel tank pressure (P) normalized relative to fuel fill rate. The fuel fill rate is estimated as a function of time to fill the capacity of the tank and a capacity of the tank. Dashed line 813 indicates a pre-calibrated FP for a functional EVAP system including one canister. The seventh plot, line 816, denotes a flag such as a diagnostic code set to indicate that the canister is missing and has been replaced by a straight line.

Prior to time t1, the engine is being operated to propel the vehicle. The CPV is in an open position to enable purging of the canister to the engine intake manifold. As the canister is purged, the canister load decreases. The FTIV is maintained in a closed position such that fuel vapor are contained within the fuel system during the purging. The fuel level in the fuel tank changes with engine operation. Since any degradation of the EVAP system is not diagnosed, the flag is maintained in an off position.

At time t1, in response to a decrease in torque demand, the engine is shut-down. Upon engine shut-down, the CPV is actuated to a closed position to seal the engine intake manifold from the canister. At time t3, refueling is initiated at a gas station and fuel is pumped into the fuel tank. Upon initiation of refueling, the FTIV is actuated to an open position to allow refueling vapor from the fuel vapor recovery line and the fuel tank to flow to the canister via the fuel vapor line. Between t2 and t3, as fuel is added to the fuel tank, the fuel level in the tank increases. Over the duration of fueling, the fuel tank pressure is monitored and the normalized fuel tank pressure (FP) is estimated. The FP is compared to the pre-calibrated FP, as shown by dashed line 813. The estimated FP is substantially equal to (within 5% variation) the pre-calibrated FP, thereby indicating that the canister is operating as desired and providing a back pressure as fuel vapors enter the canister.

At time t3, refueling is completed. In response to refueling being completed, the FTIV is actuated to a closed position. Following the completion of refueling, at time t4, the engine is restarted and the vehicle is operated via engine torque. Since the EVAP system is diagnosed to be robust, any alteration to engine operation is not desired.

In an alternate example, if during the refueling, as shown by dashed line 814, if the FP was estimated to be substantially lower than the pre-calibrated FP, as shown by dashed line 813, it would have been inferred that the canister is not exerting back-pressure as desired. The lack of back-pressure may be attributed to removal of the canister and replacement of the canister with a straight line. During such a situation, at t3, a flag would have been set indicating EVAP system degradation and during subsequent engine operation, engine load and engine speed may be lowered and canister purging may be disabled until the EVAP system is serviced.

In this way, by comparing a ratio of normalized fuel tank pressure and a fuel fill rate to a threshold, it is possible to identify if one or more fuel vapor canisters are missing and replaced with straight lines even if EVAP system diagnostics do not detect any leaks in the system. Further, the comparison of the ratio of the normalized fuel tank pressure and the fuel fill rate to another threshold, it is possible to identify clogging in the fuel vapor canisters. The technical effect of comparing the ratio to the threshold, is that the number of canisters missing in a multi-canister EVAP system may be identified and suitable mitigating actions may be undertaken. Overall, by using existing engine components for complete EVAP system diagnostics, robustness of the EVAP system may be improved and emissions compliance may be maintained.

An example method for an engine in a vehicle comprises: detecting a presence or an absence of a fuel vapor canister of an evaporative emissions control (EVAP) system based on a change in fuel tank pressure with an increase in fuel level. In the preceding example, additionally or optionally, the detection of the presence or the absence of the fuel vapor canister is carried out upon passing of an engine off natural vacuum test indicating absence of a leak in the EVAP system. In any or all of the preceding examples, additionally or optionally, passing the engine off natural vacuum test includes, during an engine-off condition, the fuel tank pressure reaching either a first, higher pressure threshold during a pressure rise test or a second, lower pressure threshold during a vacuum test. In any or all of the preceding examples, the method further comprising, additionally or optionally, during refueling, monitoring the change in the fuel tank pressure and a fuel fill level in a fuel tank. In any or all of the preceding examples, the method further comprising, additionally or optionally, during the refueling, estimating a fuel fill rate as a function of a time to fill a capacity of the fuel tank and the capacity of the fuel tank. In any or all of the preceding examples, the method further comprising, additionally or optionally, during the refueling, estimating a normalized fuel tank pressure as a ratio of the fuel tank pressure to the fuel fill rate. In any or all of the preceding examples, additionally or optionally, detecting the absence of the fuel vapor canister is in response to the normalized fuel tank pressure being lower than a first threshold pressure within a first threshold duration. In any or all of the preceding examples, additionally or optionally, the detection of the absence of the fuel vapor canister includes detection of the fuel vapor canister being replaced by a straight line joining a purge line of the EVAP system to a vent line of the EVAP system. In any or all of the preceding examples, additionally or optionally, detecting the presence of the fuel vapor canister is in response to the normalized fuel tank pressure being higher than the first threshold pressure within the first threshold duration, the first threshold pressure pre-calibrated for the engine including an unused fuel vapor canister. In any or all of the preceding examples, the method further comprising, additionally or optionally, in response to the normalized fuel tank pressure being higher than each of the first threshold pressure and a second threshold pressure, indicating clogging of the fuel vapor canister, the second threshold pressure higher than the first threshold pressure. In any or all of the preceding examples, the method further comprising, additionally or optionally, in response to the normalized fuel tank pressure being higher than the first threshold pressure and lower than the second threshold pressure, indicating the fuel vapor canister to be functional. In any or all of the preceding examples, the method further comprising, additionally or optionally, in response to the detection of absence of the fuel vapor canister or clogging of the fuel vapor canister, during immediately subsequent drive cycles, reducing one or more of an engine speed and an engine load, and operating the vehicle via motor torque.

Another example method for an engine, comprises: during a refueling, indicating absence of one or more fuel vapor canisters in an evaporative emissions control (EVAP) system based on a comparison of a normalized fuel tank pressure to one or more threshold pressure levels. In the preceding example, additionally or optionally, in response to indication of absence of one or more fuel vapor canisters, adjusting a purge schedule of remaining fuel vapor canisters during subsequent drive cycles, the EVAP system including two or more fuel vapor canisters. In any or all of the preceding examples, additionally or optionally, the indicating absence of one or more fuel vapor canisters includes, indicating absence of all fuel vapor canister in response to the normalized fuel tank pressure being lower than a first threshold pressure. In any or all of the preceding examples, additionally or optionally, the indicating absence of one or more fuel vapor canisters includes, indicating absence of two fuel vapor canisters in response to the normalized fuel tank pressure being higher than the first threshold pressure but lower than a second threshold pressure, and indicating absence of three fuel vapor canisters in response to the normalized fuel tank pressure being higher than the second threshold pressure but lower than a third threshold pressure, the first threshold pressure is lower than the second threshold pressure and the second threshold pressure is lower than the third threshold pressure. In any or all of the preceding examples, additionally or optionally, the normalized fuel tank pressure is estimated as a ratio of fuel tank pressure, as estimated via a fuel tank pressure sensor, to a fuel fill rate as estimated as a function of fuel fill level and fuel tank capacity.

Another example for an engine in a vehicle, comprises: an evaporative emissions control (EVAP) system coupled to a fuel system, the EVAP system including at one or more fuel vapor canisters, a controller storing instructions in non-transitory memory that, when executed, cause the controller to: during refueling, estimate a fuel fill level in a fuel tank via a fuel level sensor, estimate a fuel tank pressure via a fuel tank pressure sensor, estimate a fuel fill rate as a function of a time to fill the fuel tank to capacity, estimate a normalized fuel tank pressure as a function of the estimated fuel tank pressure and the fuel fill rate, and indicate one or more fuel vapor canisters missing based on the normalized fuel tank pressure being lower than a first threshold pressure. In the preceding example, additionally or optionally, the controller includes further instructions to: indicate a number of canisters missing based on a difference between the normalized fuel tank pressure and the first threshold pressure, the number of canisters missing increasing with the difference between the normalized fuel tank pressure and the first threshold pressure increasing. In any or all of the preceding examples, additionally or optionally, the controller includes further instructions to: indicate the one or more canisters to be present and not degraded in response to the normalized fuel tank pressure being higher than the first threshold pressure and lower than a second threshold pressure.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
during a refueling, indicating absence of one or more fuel vapor canisters in an evaporative emissions control (EVAP) system based on a comparison of a normalized fuel tank pressure to one or more threshold pressure levels.

2. The method of claim 1, further comprising, in response to indication of absence of one or more fuel vapor canisters, adjusting a purge schedule of remaining fuel vapor canisters during subsequent drive cycles, the EVAP system including two or more fuel vapor canisters.

3. The method of claim 1, wherein the indicating absence of one or more fuel vapor canisters includes, indicating absence of all fuel vapor canister in response to the normalized fuel tank pressure being lower than a first threshold pressure.

4. The method of claim 3, wherein the indicating absence of one or more fuel vapor canisters includes, indicating absence of two fuel vapor canisters in response to the normalized fuel tank pressure being higher than the first threshold pressure but lower than a second threshold pressure, and indicating absence of three fuel vapor canisters in response to the normalized fuel tank pressure being higher than the second threshold pressure but lower than a third threshold pressure, the first threshold pressure is lower than the second threshold pressure and the second threshold pressure is lower than the third threshold pressure.

5. The method of claim 1, wherein the normalized fuel tank pressure is estimated as a ratio of fuel tank pressure, as estimated via a fuel tank pressure sensor, to a fuel fill rate as estimated as a function of fuel fill level and fuel tank capacity.

6. A system for an engine in a vehicle, comprising:
an evaporative emissions control (EVAP) system coupled to a fuel system, the EVAP system including at one or more fuel vapor canisters;
a controller storing instructions in non-transitory memory that, when executed, cause the controller to:
during refueling,
estimate a fuel fill level in a fuel tank via a fuel level sensor;
estimate a fuel tank pressure via a fuel tank pressure sensor;
estimate a fuel fill rate as a function of a time to fill the fuel tank to capacity;
estimate a normalized fuel tank pressure as a function of the estimated fuel tank pressure and the fuel fill rate; and
indicate one or more fuel vapor canisters missing based on the normalized fuel tank pressure being lower than a first threshold pressure.

7. The system of claim 6, wherein the controller includes further instructions to: indicate a number of canisters missing based on a difference between the normalized fuel tank pressure and the first threshold pressure, the number of canisters missing increasing with the difference between the normalized fuel tank pressure and the first threshold pressure increasing.

8. The system of claim 6, wherein the controller includes further instructions to: indicate the one or more canisters to be present and not degraded in response to the normalized fuel tank pressure being higher than the first threshold pressure and lower than a second threshold pressure.

\* \* \* \* \*